United States Patent
Li et al.

(10) Patent No.: US 11,498,771 B2
(45) Date of Patent: Nov. 15, 2022

(54) PARCEL SORTING SYSTEM AND METHOD

(71) Applicant: BEIJING GEEKPLUS TECHNOLOGY CO., LTD., Chaoyang District Beijing (CN)

(72) Inventors: Hongbo Li, Chaoyang District Beijing (CN); Fandi Yu, Chaoyang District Beijing (CN); Kai Liu, Chaoyang District Beijing (CN)

(73) Assignee: BEIJING GEEKPLUS TECHNOLOGY CO., LTD., Chaoyang District Beijing (CN)

( * ) Notice: Subject to any disclaimer, the term of this patent is extended or adjusted under 35 U.S.C. 154(b) by 18 days.

(21) Appl. No.: 16/973,860

(22) PCT Filed: Jun. 11, 2019

(86) PCT No.: PCT/CN2019/090661
§ 371 (c)(1),
(2) Date: Aug. 31, 2021

(87) PCT Pub. No.: WO2019/238030
PCT Pub. Date: Dec. 19, 2019

(65) Prior Publication Data
US 2021/0387812 A1 Dec. 16, 2021

(30) Foreign Application Priority Data

Jun. 12, 2018 (CN) .......................... 201810600526.1
Mar. 27, 2019 (CN) .......................... 201910238195.6

(51) Int. Cl.
*B65G 47/46* (2006.01)
*B07C 3/08* (2006.01)
(Continued)

(52) U.S. Cl.
CPC ................ *B65G 47/46* (2013.01); *B07C 3/08* (2013.01); *B65G 47/71* (2013.01); *B66F 9/063* (2013.01); *B65G 2207/30* (2013.01)

(58) Field of Classification Search
CPC .. B07C 3/02; B07C 3/08; B07C 5/361; B65G 47/46; B65G 47/71; B65G 1/0492; B65G 1/133; B65G 1/137; B66F 9/063
See application file for complete search history.

(56) References Cited

U.S. PATENT DOCUMENTS 4,678,390 A * 7/1987 Bonneton ............ B65G 1/1375
414/416.03
9,152,149 B1 * 10/2015 Palamarchuk .......... G06F 16/29
(Continued)

FOREIGN PATENT DOCUMENTS

CN 105057219 A 11/2015
CN 205762371 U 12/2016
(Continued)

OTHER PUBLICATIONS

Examination Report issued for European Patent Application 19819361.7 dated Feb. 7, 2022.
(Continued)

*Primary Examiner* — Joseph C Rodriguez
(74) *Attorney, Agent, or Firm* — Arentfox Schiff LLP

(57) ABSTRACT

Provided are a parcel sorting system and method. The parcel sorting system is arranged in layers and includes: a parcel sorting layer located on an upper layer of the parcel sorting system, a moveable container carrying layer located on a lower layer of the parcel sorting system, a parcel delivery robot and a control device. The parcel sorting layer includes a modular entity platform that is a physical platform formed by splicing multiple splicable units and used for sorting parcels. The modular entity platform includes multiple delivery lattices arranged in an array and a traveling area (Continued)

constituted by gaps between the lattices and used for the parcel delivery robot traveling. One delivery lattices corresponds to one or more delivery path directions. The moveable container carrying layer includes multiple moveable containers, and a part of the containers are located below the lattices and receive the parcel from the parcel sorting layer.

19 Claims, 8 Drawing Sheets

(51) Int. Cl.
  *B65G 47/71* (2006.01)
  *B66F 9/06* (2006.01)

(56) References Cited

U.S. PATENT DOCUMENTS

| | | | | |
|---|---|---|---|---|
| 9,914,586 | B2 * | 3/2018 | Zhu | B65G 1/0492 |
| 9,962,743 | B2 * | 5/2018 | Bombaugh | B65G 47/44 |
| 10,464,106 | B1 * | 11/2019 | Mo | B07C 3/00 |
| 10,875,057 | B2 * | 12/2020 | Wagner | B07C 3/02 |
| 10,894,664 | B1 * | 1/2021 | Brady | B65G 1/1378 |
| 11,020,770 | B1 * | 6/2021 | Tilekar | B07C 3/087 |
| 2003/0226789 | A1 | 12/2003 | Shiibashi et al. | |
| 2008/0001372 | A1 * | 1/2008 | Hoffman | G06Q 10/087 280/35 |
| 2013/0184849 | A1 * | 7/2013 | Chan | G05D 1/0246 901/1 |
| 2015/0332213 | A1 * | 11/2015 | Galluzzo | B25J 15/06 700/218 |
| 2017/0174432 | A1 | 6/2017 | Zhu et al. | |
| 2019/0218035 | A1 * | 7/2019 | Futch | B65G 1/1375 |
| 2020/0109007 | A1 * | 4/2020 | Li | B65G 1/10 |
| 2021/0090001 | A1 * | 3/2021 | Glass | B65G 1/0492 |
| 2021/0299704 | A1 * | 9/2021 | Bell | B07C 3/008 |

FOREIGN PATENT DOCUMENTS

| | | |
|---|---|---|
| CN | 206981222 U | 2/2018 |
| CN | 207144155 U | 3/2018 |
| CN | 207188234 U | 4/2018 |
| CN | 207288091 U | 5/2018 |
| CN | 207413813 U | 5/2018 |
| CN | 207463644 U | 6/2018 |
| CN | 108584380 A | 9/2018 |
| CN | 109107902 A | 1/2019 |
| CN | 109107907 A | 1/2019 |
| CN | 109351643 A | 2/2019 |
| CN | 208771894 U | 4/2019 |
| CN | 109759337 A | 5/2019 |
| GN | 206661696 U | 11/2017 |
| GN | 107626600 A | 1/2018 |
| GN | 107899958 A | 4/2018 |
| WO | 99/48622 A | 9/1999 |

OTHER PUBLICATIONS

Geek Plus, "China Post EMS (Geek+ Sorting Robots Reference)", video, May 2, 2018.
CNN Business, "These robots may be after your warehouse job", video, Apr. 14, 2017.
CGTN, "Watch an army of robots efficiently sorting hundreds of parcels per hour", video, Nov. 11, 2017.
International Search Report for PCT/CN2019/090661 dated Aug. 29, 2019.
English translation of First Office Action received for corresponding Chinese Patent Application No. 201910238195.6 dated Oct. 9, 2019.
English translation of Second Office Action received for corresponding Chinese Patent Application No. 201910238195.6 dated Jun. 28, 2020.
Office Action dated Jun. 18, 2021 from corresponding Japanese Application No. 2020-568787.

* cited by examiner

PARCEL SORTING SYSTEM AND METHOD

CROSS-REFERENCES TO RELATED APPLICATIONS

This application is a national stage application filed under 35 U.S.C. 371 based on International Patent Application No. PCT/CN2019/090661, filed on Jun. 11, 2019, which claims priority to Chinese Patent Application No. 201810600526.1 filed Jun. 12, 2018 and Chinese Patent Application No. 201910238195.6 filed Mar. 27, 2019, the disclosures of which are incorporated herein by reference in their entireties.

TECHNICAL FIELD

Embodiments of the present application relate to the technical field of logistics warehousing, for example, a parcel sorting system and method.

BACKGROUND

There are mainly two kinds of automatic parcel sorting manners in the related art, one is sorting parcels through a cross-belt sorter system, and the other is sorting the parcels through a steel platform robot sorting system. However, both of these two automatic parcel sorting manners have some defects, such as high cost, fixed position and inflexible carrying, etc., so it is necessary to provide a new method for parcel sorting.

SUMMARY

The present application provides a parcel sorting system and method to solve the problems of high cost and poor flexibility of the sorting system, and improve the parcel sorting efficiency.

In an embodiment, provided is a parcel sorting system. This system is arranged in layers and includes: a parcel sorting layer located on an upper layer of the parcel sorting system, a moveable container carrying layer located on a lower layer of the parcel sorting system, a parcel delivery robot and a control device.

The parcel sorting layer includes a modular entity platform capable of carrying the parcel delivery robot, and the modular entity platform is a physical platform formed by splicing multiple splicable units and used for sorting parcels. The modular entity platform includes multiple delivery lattices arranged in an array and a traveling area constituted by gaps between the multiple delivery lattices and used for the parcel delivery robot traveling, one of the multiple delivery lattices corresponds to one or more delivery path directions.

The moveable container carrying layer includes multiple moveable containers, and a first number of the movable containers are located below the multiple delivery lattices and configured to receive the parcels from the parcel sorting layer, the first number is less than a total number of the movable containers on the movable container carrying layer.

The control device is configured to determine a target delivery lattice and a delivery path according to information about a parcel, information about the delivery lattice and path condition information about a current traveling area, and send the target delivery lattice and the delivery path to the parcel delivery robot.

The parcel delivery robot is configured to run in the traveling area on the modular entity platform according to the delivery path sent by the control device, and deliver the parcel to a movable container arranged below the target delivery lattice through the target delivery lattice according to the delivery path.

In an embodiment, further provided is a parcel sorting method. The method includes steps described below.

A control device determines a target delivery lattice and a delivery path according to information about a parcel, information about delivery lattices and path condition information about a current traveling area, and sends the target delivery lattice and the delivery path to a parcel delivery robot.

The parcel delivery robot runs in the traveling area on a modular entity platform according to the delivery path sent by the control device, and delivers the parcel to a movable container arranged below the target delivery lattice through the target delivery lattice according to the delivery path.

The modular entity platform is capable of carrying the parcel delivery robot and is located on a parcel sorting layer. The modular entity platform is a physical platform formed by splicing multiple splicable units and used for sorting parcels. The modular entity platform includes multiple delivery lattices arranged in an array and the traveling area constituted by gaps between the multiple delivery lattices and used for the parcel delivery robot traveling, and one of the multiple delivery lattices corresponds to one or more delivery path directions. Multiple movable containers are located on a moveable container carrying layer, and a first number of the movable containers are located below the multiple delivery lattices and configured to receive the parcel from the parcels sorting layer, and the first number is less than a total number of the movable containers on the movable container carrying layer.

DETAILED DESCRIPTION

Figure 1A:
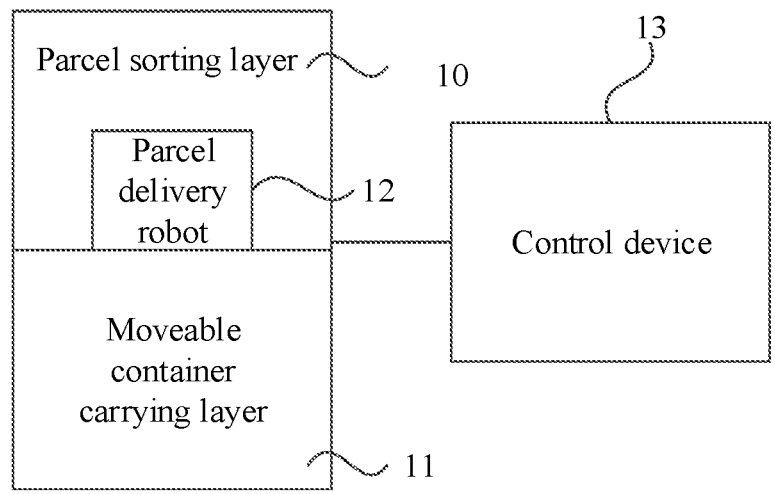
FIG. 1A is a block diagram of a parcel sorting system provided by embodiment one of the present application.

This application will be further described in detail with reference to the drawings and embodiments. It is to be understood that the embodiments set forth below are intended to illustrate but not to limit the present application. For ease of description, only part, not all, of structures related to the present application are illustrated in the drawings.

Embodiment One

FIG. 1A is a block diagram of a parcel sorting system provided by embodiment one of the present application. This embodiment is applicable to sort a parcel. The parcel sorting system is arranged in layers and includes a parcel sorting layer 10 located on an upper layer of the parcel sorting system, a moveable container carrying layer 11 located on a lower layer of the parcel sorting system, a parcel delivery robot 12 and a control device 13.

Figure 1B:
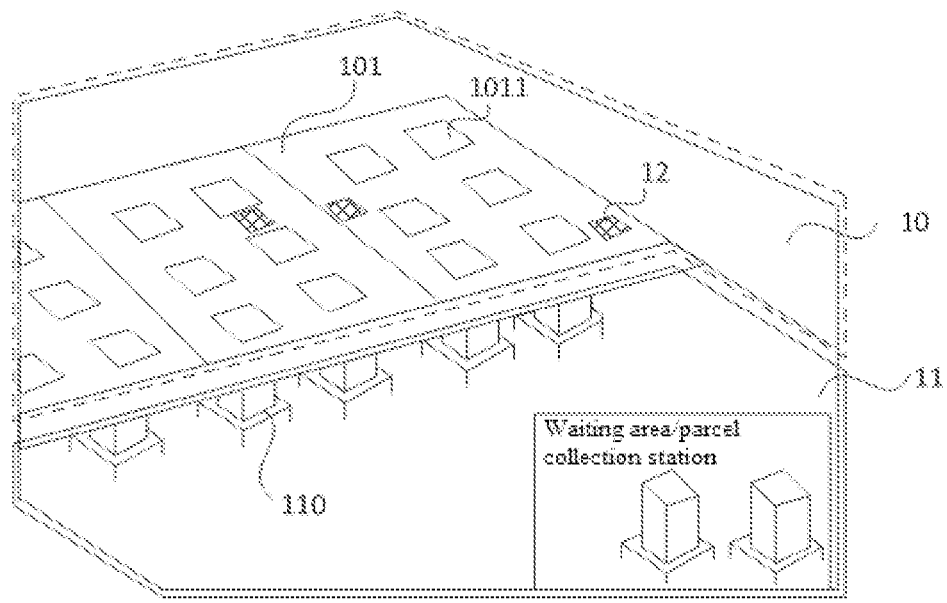
FIG. 1B is an internal schematic diagram of the parcel sorting system provided by embodiment one of the present application.

In this embodiment, FIG. 1B is an internal schematic diagram of a parcel sorting system provided by embodiment one of the present disclosure. As shown in FIG. 1B, the dotted-line-frame area is the upper layer inside the parcel sorting system, i.e. the parcel sorting layer 10, and the solid-line-frame area is the lower layer inside the parcel sorting system, i.e. the moveable container carrying layer 11. The control device (not shown in FIG. 1B) establishes a communication connection with the parcel delivery robot 12 and is configured to implement controlling and scheduling of the entire parcel sorting system. In an embodiment, the control device refers to a software system having data storage and information processing capabilities, and may be connected to the parcel delivery robot 12, and other hardware input systems or software systems in the parcel sorting system in a wired or wireless manner. The control device may transmit tasks to the parcel delivery robot 12, count a goods sorting situation, detect a working state of the system, transmit information to the staff, and transmit control instructions to the parcel delivery robot 12 and the like. The parcel delivery robot 12 may have its own intelligent system and is capable of communicating with the control device and receiving the control instructions sent by the control device.

The parcel sorting layer 10 includes a modular entity platform 101 capable of carrying the parcel delivery robot 12, and the modular entity platform 101 is a physical platform formed by splicing multiple splicable units and used for sorting the parcel. The modular entity platform 101 includes multiple delivery lattices arranged in an array and a traveling area, the traveling area is constituted by gaps between the multiple delivery lattices 1011 and used for the parcel delivery robot 12 traveling, and one of the multiple delivery lattices 1011 corresponds to one or more delivery path directions.

Figure 1C:
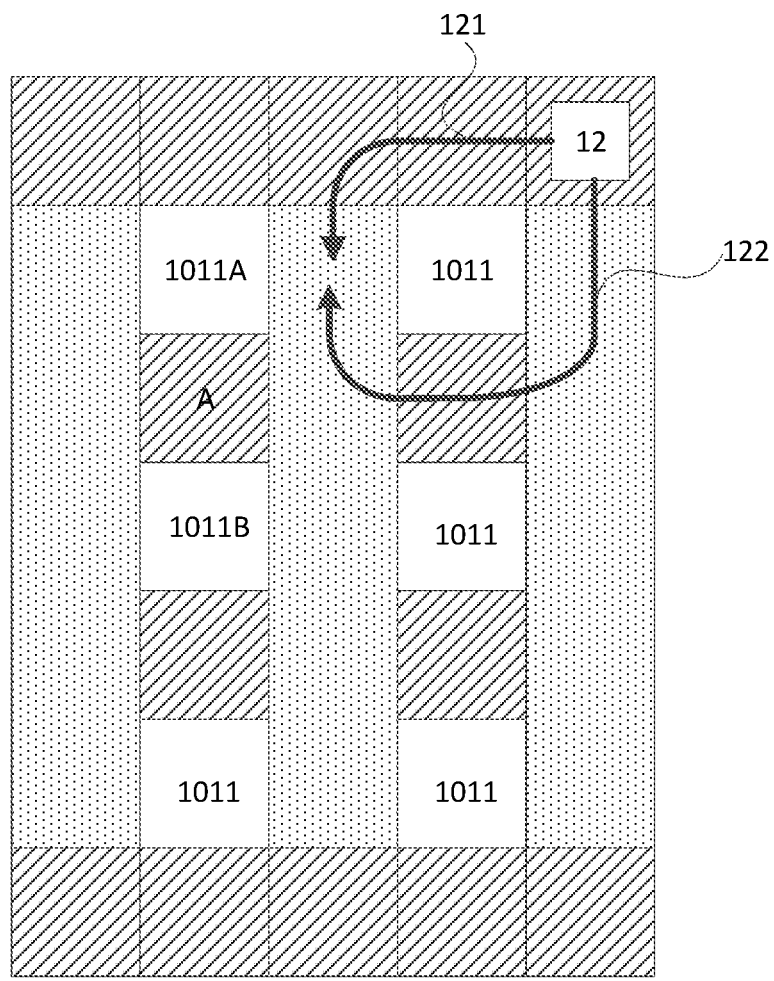
FIG. 1C is a partial schematic diagram of a modular entity platform of the parcel sorting system provided by embodiment one of the present application.

In this embodiment, it can be seen from the parcel sorting layer 10 in FIG. 1B, the parcel sorting layer 10 includes the parcel delivery robot 12 and the modular entity platform 101 carrying the parcel delivery robot 12, and the parcel robot 12 runs on the modular entity platform 101. FIG. 1C is a partial schematic diagram of a modular entity platform of a parcel sorting system provided by embodiment one of the present disclosure. As shown in FIG. 1C, the multiple splicable units constituting the modular entity platform 101 in this embodiment may be units of various specifications, such as splicable units of cubes (as shown by left oblique bar filling blocks in FIG. 1C) or splicable units of cuboids (as shown by dot filling blocks in FIG. 1C) and the like. In an embodiment, the multiple splicable units have at least one shape of a strip, an arc, a zigzag, a triangle, etc., and the modular entity platform formed by splicing the splicable units has a shape of a block (such as a cuboid or a cube) or an annular cylinder (such as an annular solid cylinder or an annular hollow cylinder), etc, which is not limited in this embodiment.

The delivery lattices 1011 on the modular entity platform 101 are empty window positions left when the modular entity platform 101 is constructed by the splicable units, and the empty window positions are arranged in an array. In an embodiment, the empty window positions may be arranged in other ways according to actual requirements, which is not limited in this embodiment. The delivery lattice 1011 allows the parcel delivery robot to deliver the parcel into the movable container located in the lower movable container carrying layer 11 from this delivery lattice. This embodiment adopts the multiple splicable units to construct the modular entity platform. The advantage of such configuration is that the platform is easy to transport, install and disassemble, and the modular entity platform can be reused after disassembly and assembly according to actual requirements, which improves the flexibility and scalability of the modular entity platform.

The modular entity platform 101 also includes an area for the parcel delivery robot 12 traveling, and the area is located between the multiple delivery lattices 1011, such as a gap area A between a delivery lattice 1011A and a delivery lattice 1011B. That is, on the modular entity platform 101, areas in which the splicable units are located are all the area for the parcel robot 12 traveling. For each of the multiple delivery lattices 1011, during the parcel delivery robot reaching this delivery lattice, one or more alternative delivery paths directions may be provided, for example, as shown in FIG. 1C, when the parcel delivery robot 12 reaches the delivery lattice 1011A from the position shown in the figure, the alternative delivery paths directions may be a delivery path direction 121, a delivery path direction 122 and the like. Selecting which delivery path by the parcel delivery robot 12 specifically for traveling to the corresponding delivery lattice 1011A depends on an instruction transmitted by the control device 13, or the real-time path condition of the traveling area, etc.

The movable container carrying layer 11 includes multiple movable containers 110, and a part (or a first number, where the first number is less than a total number of movable containers 110 on the movable container carrying layer 11) of the movable containers 110 are located below the delivery lattice 1011 and is configured to receive the parcel from the parcel sorting layer 10. In an embodiment, at least one movable container 110 is provided below each delivery lattice 1011.

As shown in FIG. 1B, in this embodiment, the movable container carrying layer 11 is located below the parcel sorting layer 10 and is configured to be placed with the multiple movable containers 110, and the multiple movable containers 110 may be common containers for storing goods to be delivered, such as a common cage car, etc. In an embodiment, a movable container 110 is configured to carry items having common properties, for example, a certain movable container 110 is configured to carry and send a parcel to be delivered to City A.

Figure 1D:
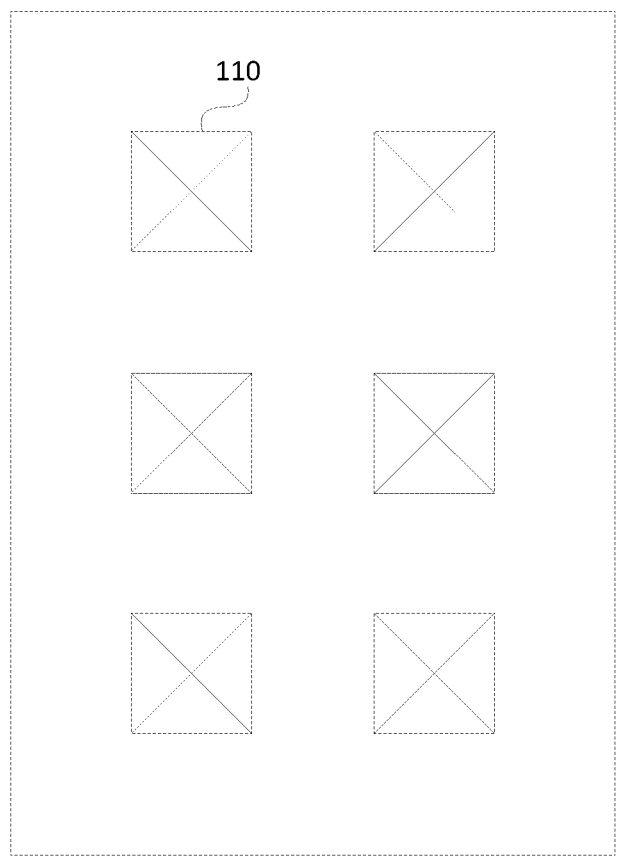
FIG. 1D is a partial schematic diagram of a moveable container carrying layer of the parcel sorting system provided by embodiment one of the present application.

In this embodiment, as shown in FIGS. 1A to 1C, at least one movable container 110 shall be placed under each delivery lattice 1011 for delivery in the modular entity platform 101 so as to avoid that the parcel falls directly on the ground of the movable container carrying layer 11 after the parcel delivery robot 12 unloads the parcel from the delivery lattice 1011 and bring inconvenience to the storage and carrying of the parcel. Since the multiple delivery lattices 1011 in the modular entity platform 101 work simultaneously, multiple movable containers 110 are provided on the movable container carrying layer 11. The number of the movable containers 110 in this embodiment is usually greater than the number of the delivery lattices 1011 in the modular entity platform 101 to ensure that an idle movable container 110 is provided for replacing the full movable container 110 after the movable container 110 below a certain delivery lattice 1011 is full, and further ensure that the parcel sorting system is operated normally. In the multiple movable containers 110, a part of the movable containers 110 are located below the delivery lattices 1011 of the modular entity platform 101 and are configured to receive the parcel from the parcel sorting layer. For example, FIG. 1D is a partial schematic diagram of a moveable container carrying layer of a parcel sorting system provided by embodiment one of the present application. As shown in FIGS. 1A to 1D, with respect to the partial schematic diagram of the modular entity platform in FIG. 1C, at least one movable container 110 is arranged below each delivery lattice 1011 in the modular entity platform 101 and configured for receiving the parcel delivered from the delivery lattice 1011 above the at least one movable container 110. The remaining movable containers 110 may be located in a waiting area of the movable container carrying layer 11, and the movable containers 110 in the waiting area are empty movable containers 110 and are configured to replace the full movable containers 110 below the delivery lattices 110. The remaining movable containers 110 may also be located at a parcel collection station, and the movable containers 110 at the parcel collection station are usually movable containers 110 containing the parcel and are configured to wait for manually or mechanically loading the parcel to a corresponding position, for example, as shown in the bottom-right corner of FIG. 1B.

In another embodiment, the modular entity platform of the parcel sorting system in this embodiment is arranged in single-layer or arranged in multi-layer. In a modular entity platform arranged in multi-layer, every two adjacent layers are arranged in parallel, a part (a second number, where the second number is less than or equal to the first number) of the movable containers are located directly below the delivery lattices. In an embodiment, in a case where the second number is less than the first number, it may be understood that multiple movable containers may be provided below the delivery lattices, and not all of the multiple movable containers are located directly below the delivery lattices. For example, in a case where two movable containers are provided below the delivery lattice, one is located directly below the lattice and the other is not located directly below the delivery lattice. In the modular entity platform arranged in multi-layer, positions of the delivery lattices at different layers are same in a horizontal direction, or the delivery lattices at different layers in the same position are facing with each other in a vertical direction.

In an embodiment, the modular entity platform is not limited to the single-layer arrangement shown in FIG. 1B.

The modular entity platform may also be arranged in multi-layer, and the multiple layers are arranged in parallel in the horizontal direction. Each layer is also formed by splicing the splicable units, and each layer also includes multiple delivery lattices arranged in an array and the traveling area formed by gaps between the multiple delivery lattices and used for the parcel delivery robot traveling. And the positions of the delivery lattices at different layers are the same in the horizontal direction, or the delivery lattices at different layers in the same position are facing with each other in the vertical direction. In an embodiment, the same position refers to a position where an X-axis in the horizontal direction and a Y-axis in the horizontal direction are located, excluding a position where a Z-axis in the vertical direction is located. The height between every two adjacent layers is greater than or equal to the height of the parcel delivery robot, thereby ensuring that the parcel delivery robot may normally run between every the two adjacent layers and carry out the parcel delivery operation. In one example, the height between the two adjacent layers may be the same or different. The modular entity platform of the parcel sorting system is arranged in multi-layer. The advantage of such configuration is that a movable container may simultaneously receive the parcel delivered by multiple parcel delivery robots from multiple layers, which improves the sorting efficiency of the whole parcel sorting system.

In an embodiment, the traveling area of the modular entity platform is provided with an identification icon, and the identification icon is used for, during the parcel delivery robot traveling, assisting the parcel delivery robot to determine whether a current traveling path is consistent with a traveling path sent by the control device.

The identification icon may be a two-dimensional code, a bar code, a ribbon or the like, and may be printed or installed in the traveling area of the modular entity platform. In one example, one identification icon may be set every a preset distance (e.g., 1 m). During traveling, the parcel delivery robot scans the identification icon of the traveling area, acquires current position information and compares with the delivery path sent by the control device so as to determine whether the current position is a position in the delivery path sent and planned by the control device, and whether the current driving direction is correct, etc. In one example, in order to increase a friction force between the parcel delivery robot and the modular entity platform in the traveling area, a layer of wear-resistant and high friction floor glue or carpet may also be covered on the traveling area of the modular entity platform, and the identification icon may be printed or installed on the floor glue or the carpet.

A specific working process of the parcel sorting system of this embodiment is described below.

The control device is configured to, according to information about the parcel, information about the delivery lattices and path condition information about the current traveling area, determine a target delivery lattice and a delivery path and send the target delivery lattice and the delivery path to the parcel delivery robot.

The information about the parcel may be city information about the parcel to be delivered, type information about an item in the parcel, or attribute information about the item in the parcel and the like. For example, if the parcels to be sorted are sorted according to the city of the receiving address, the information about the parcel in this case may be the city information about the parcel to be delivered. If the parcels to be sorted are sorted according to the type of the item in the parcel, the information about the parcel in this case may be the type information about the item in the parcel.

The information about the delivery lattice is related to the information about the parcel. If the information about the parcel is the city information about the parcel to be delivered, the information about the delivery lattice is city information corresponding to each delivery lattice. If the information about the parcel is the type information about the item in the parcel, the information about the delivery lattice is item type information corresponding to each delivery lattice. If the information about the parcel is the attribute information about the item in the parcel, the information about the delivery lattice is attribute information corresponding to each delivery lattice. The path condition information of the traveling area may refer to, on the modular entity platform, a position where the parcel delivery robot exists in the traveling area, a state of the existing parcel delivery robot and the like.

In this embodiment, the target delivery lattice may be determined according to the information about the parcel and information about the multiple delivery lattices on the modular entity platform. In an embodiment, a delivery lattice matching the information about the parcel may be selected from the multiple delivery lattices as the target delivery lattice. For example, the control device may store information about each delivery lattice in advance, after the information about the parcel is acquired, the information about the parcel is matched with the information about each delivery lattice, the successfully matched delivery lattice is taken as the target delivery lattice. The delivery path may be further determined, after the target delivery lattice is determined according to the information about the parcel and the information about the delivery lattice, according to the target delivery lattice and the path condition information of the current traveling area. In an embodiment, determining the delivery path may be: taking the target delivery lattice as an end point, taking a position where the parcel delivery robot performing this parcel delivery is located as a start point, planning at least one travelable path, then combining with the path condition information of an area where the at least one travelable path is located, and selecting one path which is the shortest and the least congested as the delivery path for this delivery. After determining the target delivery lattice and the delivery path, the control device sends the target delivery lattice and the delivery path to the parcel delivery robot which performs this parcel delivery.

The parcel delivery robot is configured to run in the traveling area on the modular entity platform according to the delivery path sent by the control device, and deliver the parcel to the movable container arranged below the target delivery lattice through the target delivery lattice according to the delivery path.

In this embodiment, after receiving the target delivery lattice and the delivery path sent by the control device, according to the received delivery path, the parcel delivery robot travels to the target delivery lattice and delivers the carried parcel into the target delivery lattice, and this parcel enters into the movable container arranged below the target delivery lattice through the target delivery lattice.

In another embodiment, the parcel delivery robot delivers the parcel through the target delivery lattice as follows: the parcel delivery robot maintains a movement state of running at a constant speed or implementing a deceleration during a process in which the parcel delivery robot runs to the target delivery lattice and delivers the parcel to the movable container arranged below the target delivery lattice through the target delivery lattice.

Figure 1E:
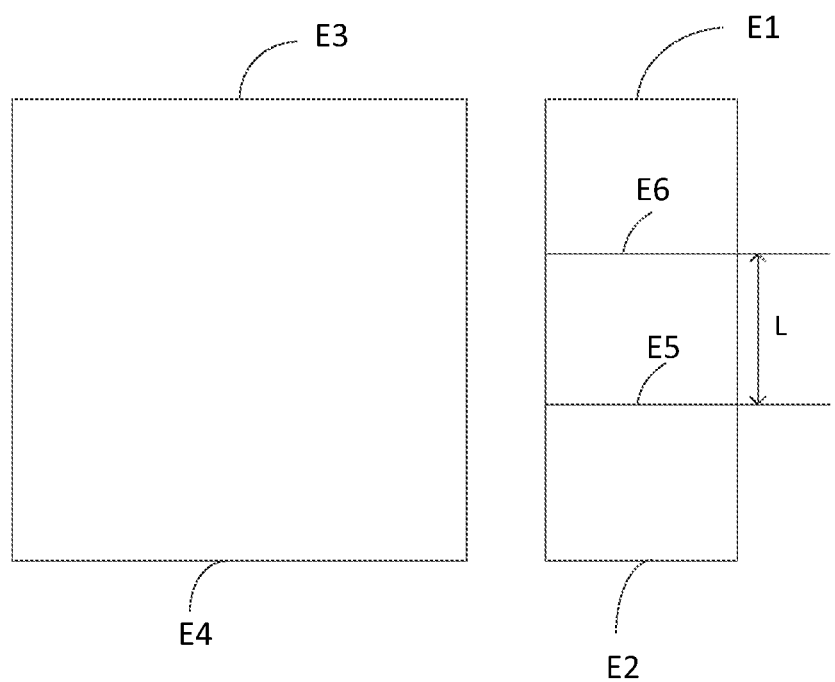
FIG. 1E is a schematic diagram of a parcel delivery robot moving to deliver a parcel provided by embodiment one of the present application.

FIG. 1E is a schematic diagram illustrating a parcel delivery robot moving to deliver a parcel provided by embodiment one of the present application. As shown in FIG. 1E, when a first boundary E1 of the parcel delivery robot coincides with a first boundary E3 of the target delivery lattice, the parcel delivery robot keeps running at a constant speed or implementing a deceleration and performing the delivery operation until the parcel is delivered to the movable container corresponding to the target delivery lattice. When a second boundary E2 of the parcel delivery robot coincides with a second boundary E4 of the target delivery lattice, the parcel delivery robot keeps running at a constant speed or implementing a deceleration and ends the delivery operation. In an embodiment, a boundary E5 refers to a position of the second boundary of the parcel delivery robot when the first boundary E1 of the parcel delivery robot coincides with the first boundary E3 of the parcel delivery lattice. A boundary E6 refers to a position of the first boundary of the parcel delivery robot when the second boundary E2 of the parcel delivery robot coincides with the second boundary E4 of the parcel delivery robot. A safe delivery range of the parcel delivery robot is L. When a running speed of the parcel delivery robot is V, a delivery action of the parcel delivery robot must be completed within T time, where T=L/V. In an embodiment, when the delivery action of the parcel delivery robot is not completed within T time, the delivery action is stopped, the parcel to be delivered is delivered to an abnormal parcel lattice, or the delivery is performed again after the parcel delivery robot travels a loop again. In an embodiment, the parcel delivery robot delivers the parcel in a belt conveying manner, a turnover plate delivery manner or a pushing manner. Delivering the parcel in the pushing manner may be that: the parcel delivery robot is installed with a telescopic device (such as a spring telescopic device), and during delivering the parcel, the telescopic device extends horizontally, contacts with the parcel, and pushes the parcel placed on the parcel delivery robot to a corresponding lattice.

In an embodiment, the number of delivery lattices on the modular entity platform may be greater than types (i.e. the delivery path directions) of the parcel that needs to be classified. Then when abundant delivery lattices on the modular entity platform are provided, multiple delivery lattices may be arranged for the delivery path direction of one type of the parcel, and the multiple delivery lattices are distributed at different positions of the modular entity platform so as to reduce the congestion phenomenon of the parcel delivery robot during the delivery process, and when one delivery lattice is locked, the parcel delivery robot may also deliver the parcel to other delivery lattices in the same delivery path direction. In an embodiment, since the movement frequency of the parcel delivery robot in the parcel sorting system is relatively large, a delivery path direction with a large parcel delivery volume may be configured as a delivery path direction with high heat, and a delivery lattice corresponding to this delivery path direction may be arranged as a delivery lattice near a supply station so as to shorten a running distance of the parcel delivery robot and improve the parcel sorting efficiency.

The parcel sorting system provided by this embodiment is arranged in multi-layer, and the parcel sorting system includes the parcel sorting layer located on the upper layer of the parcel sorting system, the moveable container carrying layer located on the lower layer of the parcel sorting system, the parcel delivery robot and the control device. The parcel sorting layer is the modular entity platform capable of carrying the parcel delivery robot, and the modular entity platform is a physical platform formed by splicing multiple splicable units and used for sorting the parcel. The modular entity platform includes multiple delivery lattices arranged in an array and the traveling area constituted by gaps between the multiple delivery lattices and used for the parcel delivery robot traveling. One of the multiple delivery lattices corresponds to one or more delivery path directions. The moveable container carrying layer includes multiple moveable containers, and a part of the movable containers are located below the multiple delivery lattices and configured to receive the parcel from the parcel sorting layer. The control device is configured to, according to the information about the parcel, the information about the delivery lattice and the path condition information about the current traveling area, determine the target delivery lattice and the delivery path and sends the target delivery lattice and the delivery path to the parcel delivery robot. The parcel delivery robot then runs in the traveling area on the modular entity platform according to the delivery path sent by the control device, and delivers the parcel to the movable container arranged below the target delivery lattice through the target delivery lattice according to the determined delivery path. The solution of the embodiment of the present application can solve the problems of high cost and poor flexibility of the sorting system, and improve the parcel sorting efficiency.

Embodiment Two

Figure 2:
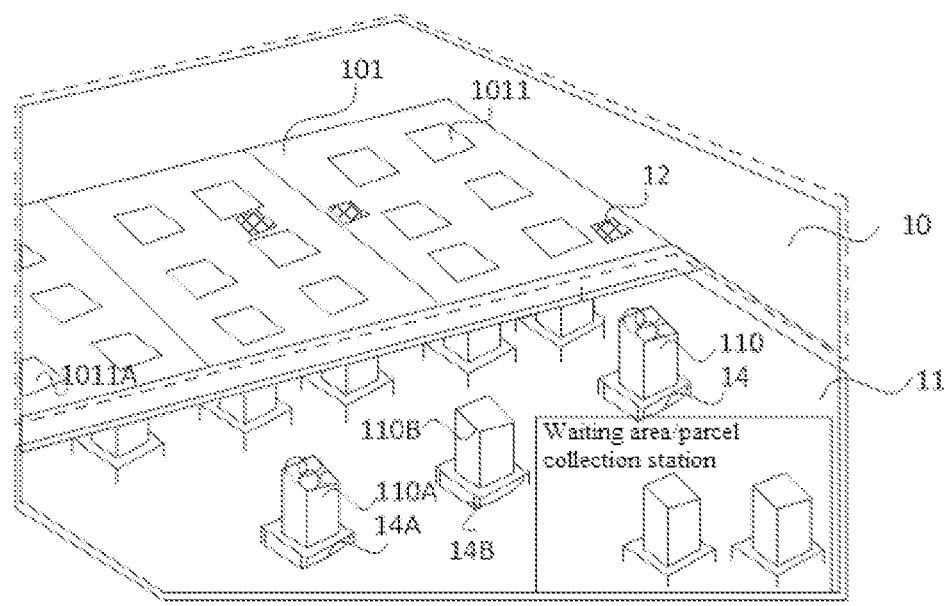
FIG. 2 is an internal schematic diagram of another parcel sorting system provided by embodiment two of the present application.

This embodiment further optimizes a parcel sorting system on the basis of the above embodiment. FIG. 2 is an internal schematic diagram of another parcel sorting system provided by embodiment two of the present application. The optimized parcel sorting system also includes a carrying robot 14, and the carrying robot 14 is configured to carry the movable container 110. The movable container 110 includes a cage car. The carrying robot 14 is located below the cage car and is configured to drive the cage car to travel on the movable container carrying layer 11.

In this embodiment, the carrying robot 14 is located on the movable container carrying layer 11 of the parcel sorting system and is configured to carry the movable container 110, for example, the carrying robot 14 carries the movable container 110 from below the delivery lattice 1011 to a parcel collection station, or carries the movable container 110 from a waiting area to below the delivery lattice 1011, etc. As shown in FIG. 2, when carrying the movable container 110, the carrying robot 14 first travels below the movable container 110 (such as a cage car), thereby driving the movable container 110 to travel on the movable container carrying layer 11 and carrying the movable container 110 to a corresponding position.

On the basis of the working process in the above embodiment, the following working process is added to the parcel sorting system described in this embodiment.

The control device is further configured to, when the parcels collected in the movable container satisfy a collection condition, and the movable container is a target movable container, lock a delivery lattice bound to a position where the target movable container is located, allocate a first carrying robot to the target movable container, plan a carrying path for the first carrying robot according to the position where the target movable container is located, generate a carrying instruction corresponding to the target movable container, and send the carrying instruction to the first carrying robot.

The first carrying robot is configured to, in response to the carrying instruction, travel to the target movable container according to the carrying path and carry the target movable container to the parcel collection station.

The control device is further configured to allocate a second carrying robot to an idle movable container, plan a carrying path for the second carrying robot according to a position where the target movable container is located before being carried, generate a carrying instruction corresponding to the idle movable container, and send the carrying instruction to the second carrying robot, where the carrying instruction includes the carrying path of the second carrying robot.

The second carrying robot is configured to, in response to the carrying instruction corresponding to the idle movable container, carry the idle movable container to the position where the target movable container is located before being carried according to the carrying path of the second carrying robot, and unlock the delivery lattice bound to the position where the target movable container is located before being carried.

The collection condition includes that: the movable container is full and/or a movable container collection time is reached. In an embodiment, that the movable container is full may mean that the parcel stored in the movable container reaches a maximum storage limit of the movable container. In an embodiment, the maximum storage limit of the movable container has a certain distance from the top of the movable container to prevent the parcel stored in the movable container from dropping due to the movable container is too full. The movable container collection time may be configured by the control device according to characteristics of the parcel stored in the movable container (such as a size and an occurrence frequency of this type of parcels), or may be configured manually according to the requirements, where the specific collection time may be adjusted according to actual situations.

In this embodiment, the carrying robot may have its own intelligent system and is capable of communicating with the control device and receiving a control instruction sent by the control device. The carrying instruction includes the carrying path of the first carrying robot.

In an embodiment, the control device determines whether the parcels collected in the movable container satisfy the collection condition in the following manners: manner one: if the control device receives a message that the movable container is full from a sensor, it is determined that the parcels collected in the movable container satisfy the collection condition; and/or manner two: if the control device detects that a total volume of delivered parcels in the movable container reaches a preset volume threshold or the movable container collection time is reached, it is determined that the parcels collected in the movable container satisfy the collection condition.

In an embodiment, when manner one is adopted, the sensor may be installed on the parcel delivery robot and/or the delivery lattice of the modular entity platform. A detection head of the sensor points to an upper edge of the movable container and is configured to detect whether the movable container is full of parcels. When it is detected that the movable container is full of parcels, the sensor sends a message that the movable container is full to the control device. For example, an infrared sensor is installed on a front end of the parcel delivery robot or on an edge of the delivery lattice. If the infrared sensor is installed on the edge of the delivery lattice, since the delivery lattice cannot communicate with the control device, an infinite communication module further needs to be installed on the edge of the delivery lattice, a detection head of the infrared sensor points to the movable container below the delivery lattice, when the infrared sensor detects that the movable container is full of parcels, the infrared sensor sends the message that the movable container is full to the control device through the infinite communication module.

When manner two is adopted, according to a volume of each parcel delivered into the movable container, the control device may estimate a total volume of the delivered parcels in the movable container, and compare the total volume of the delivered parcels with a preset volume threshold of the movable container. If the total volume of the delivered parcels is greater than or equal to the preset volume threshold of the movable container, it is determined that the parcels collected in the movable container satisfy the collection condition. In addition, the control device may also determine whether the collection condition is satisfied by the movable container collection time. For example, the control device starts timing from a time when the movable container is placed under the delivery lattice, and when the movable container collection time is reached, the control device determines that the parcels collected in the movable container satisfy the collection condition.

When the parcels collected in the movable container satisfy the collection condition, the delivery lattice in a position corresponding to the target movable container is locked, and the parcel delivery robot is prohibited from continuously delivering the parcel into the delivery lattice. And, the control device further allocates a carrying robot (i.e., a first carrying robot) for the target movable container; according to a position where the target movable container is located, a position where the first carrying robot is located and the parcel collection station, the control device plans the carrying path (a path from the position where the first carrying robot is located to the target movable container, and a path from the position where the target movable container is located to the parcel collection station) for the first carrying robot; and the control device generates the carrying instruction corresponding to the target movable container, and sends the carrying instruction the first carrying robot. After receiving the carrying instruction, the first carrying robot responds to the carrying instruction, travels to the target movable container according to the carrying path, and carries the target movable container to the parcel collection station.

As shown in FIG. 2, if the movable container 110A satisfies the collection condition, the movable container 110A is the target movable container, the control device locks the delivery lattice 1011A at the position where the target movable container 110A is located, and the parcel delivery robot 12 traveling on the modular entity platform 101 stops delivering the parcel into the delivery lattice 1011A. And, the control device further allocates the first carrying robot 14A to the target movable container 110A, plans the carrying path for the first carrying robot 14A, generates the carrying instruction and sends the carrying instruction to the first carrying robot 14A, and the first carrying robot 14A carries the target movable container 110A to the parcel collection station according to the carrying instruction.

In an embodiment, to prevent the movable container from deviating from a standard position when the movable container is manually or mechanically collected at the parcel collection station, the movable container may be fixed by using a carrying robot reinforcement device, or may be fixed by adding a reinforcement device on the ground.

In this embodiment, after the first carrying robot carries the target movable container to the parcel collection station, to prevent the parcel delivered to the delivery lattice by the parcel delivery robot from falling to the ground, the control device further allocates another carrying robot (i.e., a second carrying robot), plans the carrying path (i.e., a path of the second carrying robot from a current position to the idle movable container and a path of the second carrying robot from the idle movable container to the position where the target movable container is located before being carried) for the second carrying robot, generates the carrying instruction corresponding to the idle movable container, and sends the carrying instruction to the second carrying robot. The second carrying robot responds to the carrying instruction after receiving the carrying instruction, carries the idle movable container (i.e., an empty movable container) to the position where the target movable container is located before being carried. After the idle movable container is placed, a new movable container capable of continuously receiving the parcel is placed at the position where the target movable container is located before being carried, then the delivery lattice bound to the position where the target movable container is located before being carried is unlocked, and the parcel delivery robot traveling on the modular entity platform resumes delivering the parcel into the delivery lattice. In an embodiment, this process may be performed after the first carrying robot carries the target movable container to the parcel collection station, or be performed at the same time as the first carrying robot carries the target movable container, thereby reducing a locking time of the bound delivery lattice.

As shown in FIG. 2, the control device allocates a second carrying robot 14B for an idle movable container 110B, plans a carrying path for the second carrying robot 14B, generates a carrying instruction, and sends the carrying instruction to the second carrying robot 14B. The second carrying robot 14B carries the idle movable container 110B to below the delivery lattice 1011A according to the carrying instruction, then the delivery lattice 1011A is unlocked, and the parcel delivery robot 12 traveling on the modular entity platform 101 resumes delivering the parcel into the delivery lattice 1011A.

In an embodiment, paths planned by the control device for robots in the parcel sorting system of this embodiment are all annular paths. The robots described above include the parcel delivery robot and the carrying robot (including the first carrying robot and the second carrying robot), i.e., a delivery path planned for the parcel delivery robot is an annular delivery path, and the carrying path planned for the carrying robot is an annular carrying path. In an embodiment, turns of the annular delivery path and the annular carrying path are arc-shaped. In this embodiment, the annular delivery path of the parcel delivery robot and the annular carrying path of the carrying robot each are formed by a straight path and an arch-shaped path. The arc-shaped path means that the robot travels in an arc-shaped path during turning, so that the robot will not stop during turning, and the operation time of the robot is saved.

In another embodiment, the multiple movable containers may be divided into at least one group, and at least one parcel delivery robot and at least one carrying robot may be correspondingly allocated to the at least one group of movable containers.

In this embodiment, the movable containers on the movable container carrying layer have a high layout density and flexible combinations, so that at least two movable containers may be divided into at least one group according to certain rules, which improves the flexibility and scalability of the layout of the movable containers. For example, as shown in FIG. 1D, the movable containers in the figure may be divided into two groups. The three movable containers on the left are in one group, the three movable containers on the right are in another group, and at least one parcel delivery robot is allocated to each group of movable containers to deliver the parcel into the corresponding delivery lattices above the each group of movable containers, and at least one carrying robot is allocated to each group of movable containers to carry the each group of movable containers when the each group of movable containers satisfy the collection condition.

In the parcel sorting system provided by this embodiment, on the basis of the above-described embodiments, the parcel delivery robot on the parcel sorting layer delivers the parcel to be delivered to the target delivery lattice according to the delivery path sent by the control device. And, on the movable container carrying layer, when the parcels collected in the movable container satisfy the collection condition, the control device locks the delivery lattice bound to the position where the target movable container is located, prohibits the parcel delivery robot from continuously delivering the parcel into the delivery lattice. And, the control device further allocates the first carrying robot for the target movable container, plans the carrying path for the first carrying robot, and sends the carrying path to the first carrying robot, so that the first carrying robot carries the target movable container to the parcel collection station according to the carrying path. And, the control device further allocates the second carrying robot for the idle movable container, plans a carrying path for the second carrying robot, and sends the carrying path to the second carrying robot, so that the second carrying robot carries the idle movable container to the position where the target movable container is located before being carried, and then the delivery lattice bound to the position where the target movable container is locked before being carried is unlocked, so that the parcel delivery robot on the parcel sorting layer continuously to deliver the parcel into the delivery lattice. The carrying robot and the parcel delivery robot running on two different planes is implemented, the paths do not interfere with each other, and the whole parcel sorting system adopts a parallel working mode, thus the parcel sorting efficiency is improved.

Embodiment Three

Figure 3:
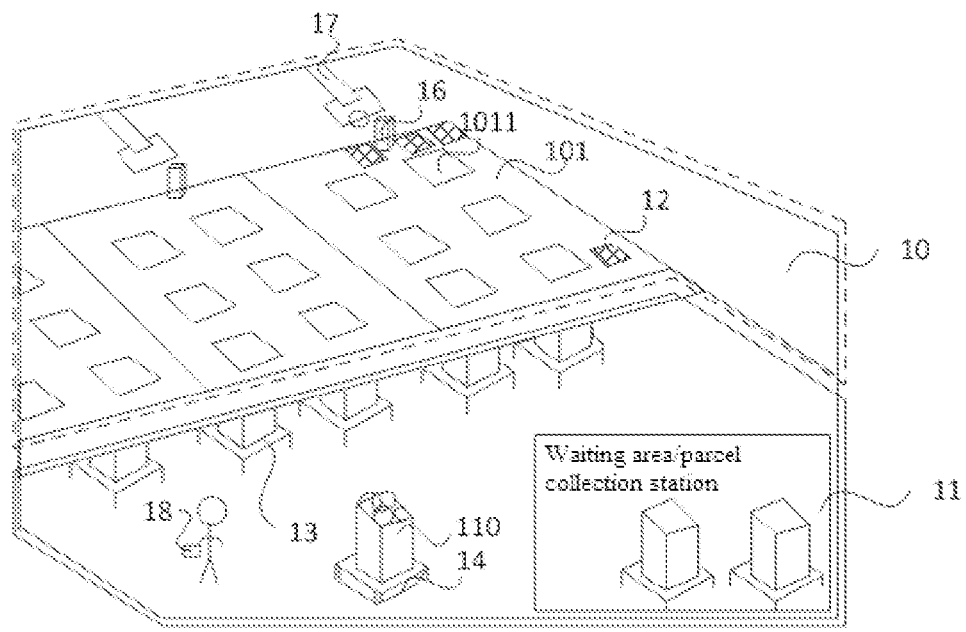
FIG. 3 is an internal schematic diagram of still another parcel sorting system provided by embodiment three of the present application.

This embodiment further optimizes a parcel sorting system on the basis of the above embodiments. FIG. 3 is an internal schematic diagram of another parcel sorting system provided by embodiment three of the present disclosure. On the basis of the above system, the optimized parcel sorting system further includes: a code scanning device 16 and a supply station 17. The code scanning device 16 is arranged in a code scanning area on the modular entity platform 101. The supply station 17 is configured to allocate a parcel to be delivered to the parcel delivery robot 12.

The parcel delivery robot 12 is further configured to carry the parcel to be delivered into the code scanning area after acquiring the parcel to be delivered from the supply station 17.

The code scanning device 16 is configured to acquire information about the parcel about the parcel to be delivered and send the information about the parcel to the control device.

In the parcel sorting system of this embodiment, the supply station may be arranged on the ground, above or below the ground, for example, the supply station 17 may be arranged above the ground as shown in FIG. 3. A parcel to be sorted is transported to a supply station area by a robot. The parcel to be sorted is picked up manually or mechanically and then placed on the parcel delivery robot. In an embodiment, one or more parcel delivery robots may wait for acquiring the parcel. When relatively more parcel delivery robots wait, the parcel delivery robot may wait for acquiring the parcel in an order of reaching the supply station. In an embodiment, during acquitting the parcel, the parcel delivery robot may slow down or stop at a preset time by default after running to the supply station, so as to facilitate manually or mechanically placing the parcel on the parcel delivery robot. After the parcel delivery robot acquires the parcel, the parcel delivery robot carries the parcel into a code scanning area. When the code scanning device in the code scanning area detects that the parcel delivery robot is approaching, the scanning device automatically scans the parcel carried by the parcel delivery robot, such as scanning a two-dimensional code or a bar code on the parcel, acquires information about the parcel, and sends the acquired information about the parcel to the control device. The control device determines a target delivery lattice and a delivery path according to the information about the parcel, information about each delivery lattice and path condition information about a current traveling area, and sends the target delivery lattice and the delivery path to the parcel delivery robot, so that the parcel delivery robot runs in the traveling area on the modular entity platform according to the delivery path sent by the control device, and delivers the parcel to the movable container arranged below the target delivery lattice through the target delivery lattice according to the determined delivery path.

In an embodiment, if the code scanning device fails to acquire the information about the parcel, i.e., if the control device does not receive the information about the parcel carried by the parcel delivery robot, or if the received information about the parcel is incorrect, the control device is further configured to take an abnormal parcel lattice on the modular entity platform as the target delivery lattice and plan a delivery path to the abnormal package lattice for the parcel delivery robot. One or more abnormal parcel lattices may be provided. When multiple abnormal parcel lattices are provided, for the parcel delivery robots at different positions on the supply station quickly delivering an abnormal parcel into the abnormal parcel lattice, multiple abnormal parcel lattices may be scattered and arranged at different positions of the modular entity platform.

In an embodiment, the control device is further configured to, after the parcel delivery robot delivers the parcel into the target delivery lattice, determine a next task location and a next traveling path for the parcel delivery robot according to a shortest path principle and/or a shortest waiting principle, and send the next task location and the next traveling path to the parcel delivery robot. The parcel delivery robot is further configured to run to the next task location to execute a next task in the traveling area on the modular entity platform according to the received traveling path.

Many types of task locations may be provided in this application, for example, a supply station, a charging station, a rest area and the like. Multiple task locations of each type may be provided, for example, multiple supply stations, charging stations and rest areas for one parcel sorting system may be provided.

In an embodiment, after the parcel delivery robot completes one parcel delivery, the control device determines the next task for the parcel delivery robot according to the actual situations, such as running to the supply station to acquire a next parcel to be delivered, charging at the charging station, resting in the rest area and the like. After the next task is determined, according to a position where the parcel delivery robot is located and the task location of the next task, the control device selects the task location of the next task from multiple task locations according to the shortest path principle and/or the shortest waiting principle, plans a traveling path for the parcel delivery robot, and sends the next task and the next traveling path to the parcel delivery robot. The parcel delivery robot runs to the next task location on the modular entity platform to perform the next task after receiving the traveling path.

In another embodiment, the control device is further configured to, if the parcel delivery robot and/or the carrying robot fails, suspend at least one carrying robot on the movable container carrying layer to facilitate a serviceman entering into the movable container carrying layer and performing repair and maintenance operations on the failure parcel delivery robot and/or the carrying robot.

In an embodiment, during running of the parcel sorting system, the parcel delivery robot and/or the carrying robot may fail. In the parcel sorting system, if the robot, either the parcel delivery robot located on the parcel sorting layer or the carrying robot located on the movable container carrying layer, fails, the serviceman enters into the lower parcel sorting layer for repair and maintenance, in this way, the normal operation of the upper parcel delivery robot will not be influenced during the repair. And at least one carrying robot on the movable container carrying layer corresponding to an area near the failure robot needs to be suspended, which can reduce the influence on the sorting efficiency of the parcel sorting system as much as possible. In an embodiment, after the control device detects that the robot fails, the control device sends relevant information (such as a failure reason, a position where the failure robot is located, etc.) about the failure robot to the serviceman, and the serviceman enters through the movable container carrying layer, reaches the position where the failure robot is located and repairs the failure robot. In an embodiment, if the failure robot is the parcel delivery robot, the serviceman may first lock the delivery lattice closest to the failure parcel delivery robot through the control device, and then the serviceman enters into the parcel sorting layer through the delivery lattice to repair the failure parcel delivery robot. If the failure robot is the carrying robot, the serviceman may directly reach the position where the failure carrying robot on the movable container carrying layer is locked to repair the failure carrying robot.

In this embodiment, to prevent the running of the carrying robot on the movable container carrying layer from interfering with the maintenance operation of the serviceman on the failure robot, the parcel sorting system in this embodiment may further include a communication device 18, and the communication device 18 is a device carried by the serviceman when the serviceman enters into the movable container carrying layer and is configured to perform a near field communication with the carrying robot.

The communication device is configured to transmit a traveling suspension signal to the surrounding environment.

The carrying robot is further configured to stop running and enter into a waiting state if the carrying robot receives the traveling suspension signal transmitted by the communication device during the running, and resume the running state until the carrying robot cannot receive the traveling suspension signal transmitted by the communication device.

In an embodiment, when the serviceman carries the communication device into the movable container carrying layer, the communication device automatically communicates with the carrying robot around the serviceman. The communication device transmits the traveling suspension signal to the surrounding environment, and a coverage range of the traveling suspension signal is the locking area of the movable container carrying layer, the carrying robot in the locking area receives the traveling suspension signal transmitted by the communication device, stops running, enters into the waiting state, and resumes the running state until this carrying robot is not in the locking area, i.e., cannot receive the traveling suspension signal transmitted by the communication device. In an embodiment, if the waiting time is relatively long, the control device may re-plan the carrying path for the carrying robot in the waiting state. In an embodiment, the stronger the traveling suspension signal transmitted by the communication device, the larger the locking area corresponding to the coverage range, and the range of the locking area, i.e. the strength of the transmitted traveling suspension signal, may be set artificially or may be automatically calculated by the control device and then sent to the communication device according to the position of the failure robot.

The parcel sorting system provided by this embodiment is added with the code scanning device, the supply station and the communication device. The parcel delivery robot acquires the parcel to be delivered from the supply station, then carries the parcel and enters into the code scanning area. The code scanning device acquires the information about the parcel on the parcel delivery robot and sends the information about the parcel to the control device. The control device determines the target delivery lattice and the delivery path according to the information about the parcel, the information about the delivery lattice and the path condition information about the current traveling area, and sends the target delivery lattice and the delivery path to the parcel delivery robot, so that the parcel delivery robot runs in the traveling area on the modular entity platform according to the delivery path sent by the control device, and delivers the parcel to the movable container arranged below the target delivery lattice through the target delivery lattice according to the determined delivery path, so that the parcel sorting process is more intelligent, and the sorting accuracy and efficiency are improved. When the robot in the parcel sorting system fails, at least one carrying robot on the movable container carrying layer is suspended, the serviceman carries the communication device into the movable container carrying layer, and through the communication between the communication device and carrying robots around the communication device, a good maintenance environment is provided for the serviceman to repair the failure robot, and simultaneously, the influence on the sorting efficiency of the parcel sorting system is reduced as much as possible.

Embodiment Four

Figure 4:
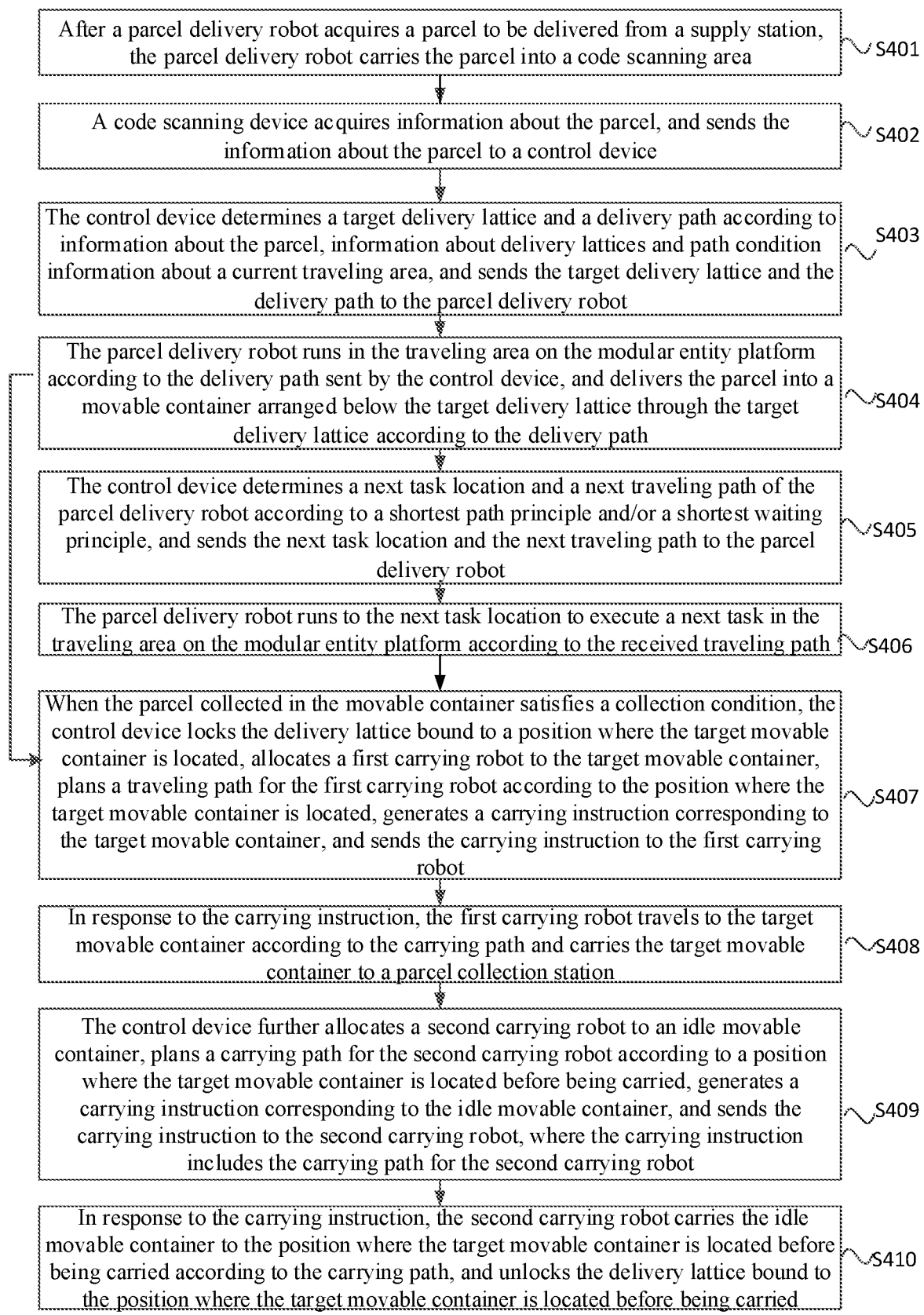
FIG. 4 is a flowchart of a parcel sorting method provided by embodiment four of the present application.

FIG. 4 is a flowchart of a parcel sorting method provided by embodiment four of the present application.

This embodiment may be applied to a case of sorting a parcel. The method may be performed by the parcel sorting system provided by the above-mentioned embodiments of the present application, and specifically includes steps described below.

In step S401, after a parcel delivery robot acquires a parcel to be delivered from a supply station, the parcel delivery robot carries the parcel into a code scanning area.

The supply station is configured to allocate the parcel to be delivered to the parcel delivery robot.

In step S402, a code scanning device acquires information about the parcel, and sends the information about the parcel to a control device.

The code scanning device is arranged in a code scanning area on a modular entity platform.

In step S403, the control device determines a target delivery lattice and a delivery path according to information about the parcel, information about a delivery lattice and path condition information about a current traveling area, and sends the target delivery lattice and the delivery path to a parcel delivery robot.

The delivery path planned by the control device for the parcel delivery robot is an annular delivery path. In an embodiment, a turn of the annular delivery path is arc-shaped.

In an embodiment, if it is determined that the code scanning device fails to acquire the information about the parcel, the control device takes an abnormal parcel lattice on the modular entity platform as a target delivery lattice.

In step S404, the parcel delivery robot runs in the traveling area on the modular entity platform according to the delivery path sent by the control device, and delivers the parcel to a movable container arranged below the target delivery lattice through the target delivery lattice according to the delivery path.

The modular entity platform is capable of carrying the parcel delivery robot and is located on a parcel sorting layer. The modular entity platform is a physical platform formed by splicing multiple splicable units and used for sorting the parcel. The modular entity platform includes multiple delivery lattices arranged in an array and a traveling area constituted by gaps between the multiple delivery lattices and used for the parcel delivery robot traveling, and one of the multiple delivery lattices corresponds to one or more delivery path direction. Multiple movable containers are provided and located on a moveable container carrying layer, and a part of the movable containers are located below the multiple delivery lattices and configured to receive the parcel from the parcel sorting layer.

In an embodiment, the modular entity platform is arranged in single-layer or arranged in multi-layer. In a modular entity platform arranged in multi-layer, every two adjacent layers are arranged in parallel, a part of the movable containers are located directly below the multiple delivery lattices. In an embodiment, in the modular entity platform arranged in multi-layer, positions of the delivery lattices at different layers are same in a horizontal direction, or the delivery lattices at different layers in the same position are facing with each other in a vertical direction.

In an embodiment, the traveling area of the modular entity platform is provided with an identification icon, and the identification icon is used for, during the parcel delivery robot traveling, assisting the parcel delivery robot to determine whether a current traveling path is consistent with the delivery path sent by the control device.

In an embodiment, the step in which the parcel delivery robot delivers the parcel to the movable container arranged below the target delivery lattice through the target delivery lattice according to the delivery path includes that: the parcel delivery robot maintains a movement state of running at a constant speed or implementing a deceleration during a process in which the parcel delivery robot runs to the target delivery lattice and delivers the parcel to the movable container arranged below the target delivery lattice through the target delivery lattice.

In an embodiment, the parcel delivery robot delivers the parcel in a belt conveying manner, a turnover plate delivery manner or a pushing manner.

In step S405, the control device determines a next task location and a next traveling path for the parcel delivery robot according to a shortest path principle and/or a shortest waiting principle.

In step S406, the parcel delivery robot runs to the next task location to execute a next task in the traveling area on the modular entity platform according to the received traveling path.

In step S407, when parcels collected in the movable container satisfy a collection condition, the control device locks the delivery lattice bound to a position where the target movable container is located, and allocates a first carrying robot to the target movable container, plans a traveling path for the first carrying robot according to the position where the target movable container is located, generates a carrying instruction corresponding to the target movable container, and sends the carrying instruction to the first carrying robot.

The carrying instruction includes the carrying path of the first carrying robot. The collection condition includes that: the movable container is full and/or a movable container collection time is reached.

In an embodiment, the control device determines whether the parcels collected in the movable container satisfy the collection condition in the following manners: manner one: if the control device receives a message that the movable container is full from a sensor, it is determined that the parcels collected in the movable container satisfy the collection condition; and/or manner two: if the control device detects that a total volume of delivered packages in the movable container reaches a preset volume threshold or the movable container collection time is reached, it is determined that the parcels collected in the movable container satisfy the collection condition.

In an embodiment, the message that the movable container is full from the sensor to the control device is determined by: detecting whether the movable container is full of parcels by the sensor installed on the parcel delivery robot and/or the delivery lattice of the modular entity platform through a detection head pointing to an upper edge of the movable container; and sending the message that the movable container is full to the control device when it is detected that the movable container is full of parcels.

In step S408, in response to the carrying instruction, the first carrying robot travels to the target movable container according to the carrying path and carries the target movable container to a parcel collection station.

The movable container includes a cage car. The carrying robot is located below the cage car and is configured to drive the cage car to travel on the movable container carrying layer.

In step S409, the control device further allocates a second carrying robot to an idle movable container, plans a carrying path for the second carrying robot according to a position where the target movable container is located before being carried, generates a carrying instruction corresponding to the idle movable container, and sends the carrying instruction to the second carrying robot, where the carrying instruction includes the carrying path of the second carrying robot.

In step S410, in response to the carrying instruction, the second carrying robot carries the idle movable container to the position where the target movable container is located before being carried according to the carrying path, and the delivery lattice bound to the position is unlocked.

In this embodiment, if the parcel delivery robot and/or the carrying robot fails, the control device suspends at least one carrying robot on the movable container carrying layer, so as to facilitate a serviceman entering into the movable container carrying layer and performing repair and maintenance operations on the failure parcel delivery robot and/or the failure carrying robot. In an embodiment, after the control device suspends at least one carrying robot on the movable container carrying layer, and the serviceman enters into the movable container carrying layer, the method further includes steps described below.

The communication device transmits a traveling suspension signal to the surrounding environment.

The carrying robot stops running and enters into a waiting state if the carrying robot receives the traveling suspension signal transmitted by the communication device during the running, and resumes the running state when the carrying robot cannot receive the traveling suspension signal transmitted by the communication device.

The communication device is a device which is carried by the serviceman when the serviceman enters into the movable container carrying layer and is used for performing a near field communication with the carrying robot.

In this embodiment, the multiple movable containers may be divided into at least one group, and at least one parcel delivery robot and at least one carrying robot may be correspondingly allocated to the at least one group of movable containers.

The embodiment of the present disclosure provides a parcel sorting method. The control device determines the target delivery lattice and the delivery path according to the information about the parcel, the information about the delivery lattice and the path condition information about the current traveling area, and sends the target delivery lattice and the delivery path to the parcel delivery robot. The parcel delivery robot runs in the traveling area on the modular entity platform according to the delivery path sent by the control device, and delivers the parcel to the movable container arranged below the target delivery lattice through the target delivery lattice according to the delivery path. When the parcels collected in the movable container satisfy the collection condition, the control device locks the target movable container, and plans the carrying path for the first carrying robot so as to control the first carrying robot to carry the target movable container to the parcel collection station according to the carrying path planned by the control device, and then the control device plans the carrying path for the second carrying robot so as to control the second carrying robot to carry the idle movable container to the position where the target movable container is located before being carried according to the carrying path planned by the control device, and the control device unlocks the delivery lattice bound to the position where the target movable container is located before being carried. The solution in the embodiment of the present application can solve the problems of high cost and poor flexibility of the sorting system, and implement that the carrying robot and the parcel delivery robot run on two different planes and the paths do not interfere with each other, and the whole parcel sorting system adopts a parallel working mode, thus the parcel sorting efficiency is improved.

The parcel sorting method provided by the embodiment of the present application may be implemented by the parcel sorting system provided by any embodiment of the present application, and have corresponding function modules and effects of the parcel sorting system.

The serial numbers of the above embodiments are merely for ease of description and do not indicate superiority and inferiority of the embodiments.

Those of ordinary skill in the art should know that the above modules or operations of the embodiments of the present application may be implemented by a general-purpose computing apparatus, the modules or operations may be concentrated on a single computing apparatus or distributed on a network formed by multiple computing apparatuses. In an embodiment, the modules or operations may be implemented by program codes executable by the computing apparatus, so that the modules or operations may be stored in a storage apparatus and executed by the computing apparatus. Alternatively, the modules or operations may be made into integrated circuit modules separately, or multiple modules or operations therein may be made into a single integrated circuit module for implementation. In this way, the present application is not limited to any specific combination of hardware and software.

The embodiments in this Description are described in a progressive manner. Each embodiment focuses on differences from other embodiments. The same or similar parts in the embodiments can be referred to by each other.

Embodiment Five

The solution of a goods-to-person intelligent storage robot has been widely popularized. And the robot is usually provided with a receiving device (e.g., a turnover plate or a belt conveyor) to receive and transport a parcel. After arriving at a designated destination, the robot places the parcel into a receiving container through the receiving device. In a process of the receiving container receiving the parcel, because the number of lattices for receiving the parcel usually is relatively small, a case where a moving robot waits in a line to unload the parcel may occur. In this case, the number of lattices becomes a bottleneck of the parcel delivery.

Figure 5:
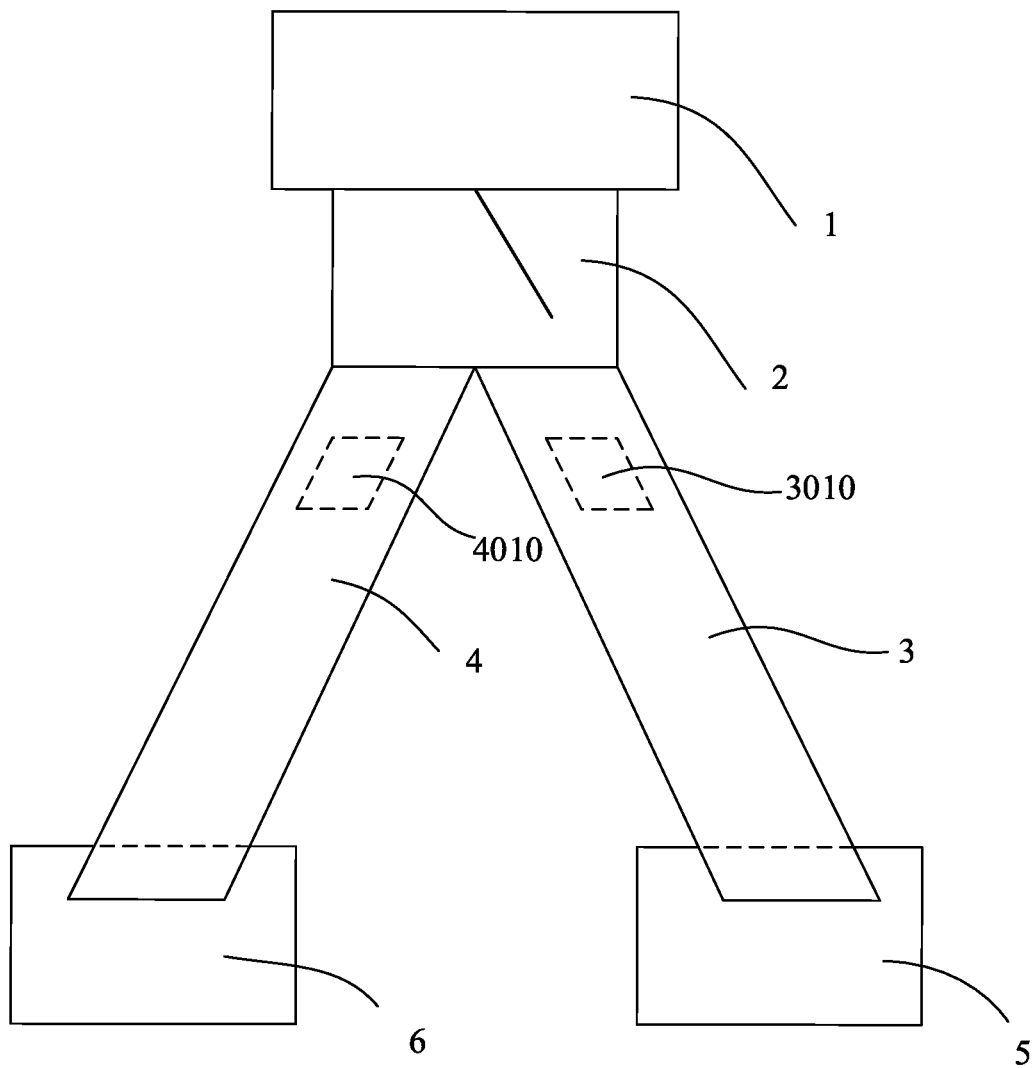
FIG. 5 is a structural diagram of a delivery lattice provided by an embodiment of the present application.

Referring to FIG. 5, an embodiment of the present application provides a delivery lattice (also referred to as a delivery channel, that is, the delivery channel may be understood as a new form of delivery lattice, which further defines the delivery lattice in the above embodiments and is also configured to receive the parcel delivered by the delivery robot), and the delivery lattice includes: an opening portion 1, a first channel 3, a second channel 4 and a switching device 2.

Figure 6:
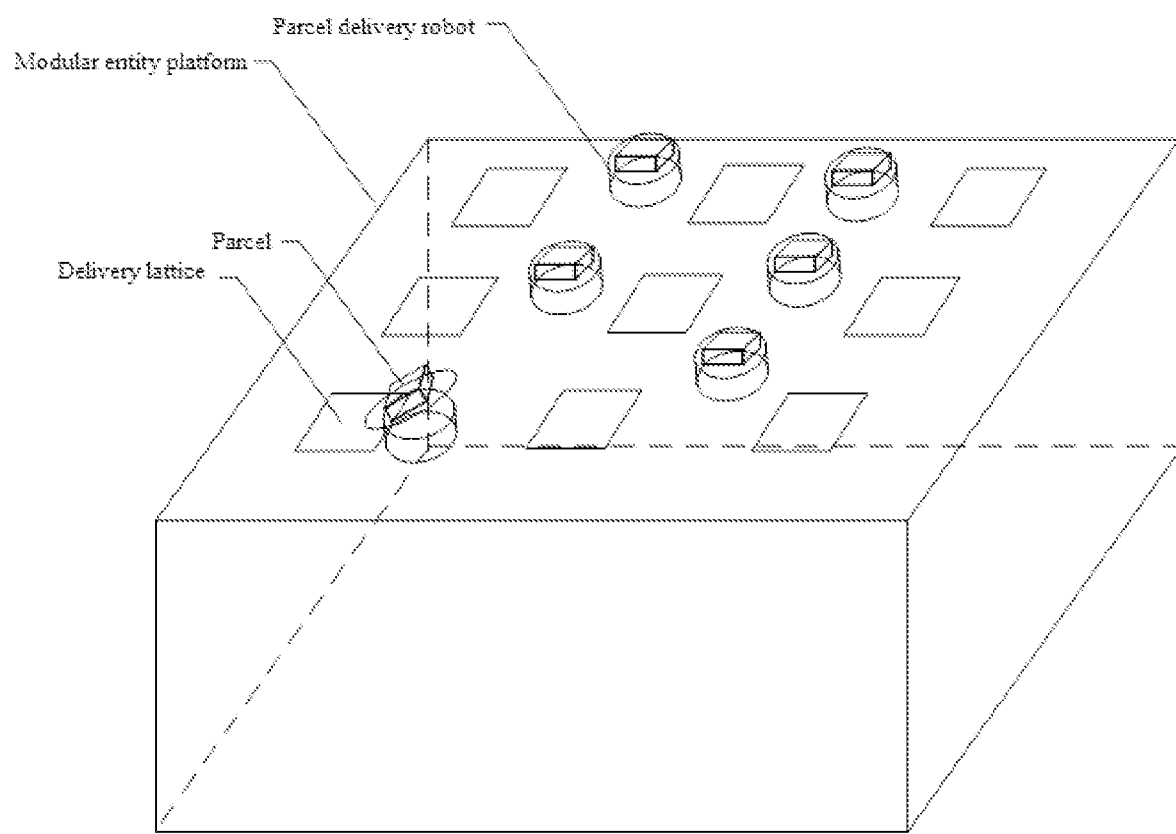
FIG. 6 is a schematic diagram of parcel delivery based on a modular entity platform provided by an embodiment of the present application.

In the parcel sorting system, the parcel delivery robot usually transports the parcel to the destination after receiving the parcel. Referring to FIG. 6, FIG. 6 shows an exemplary view of a parcel delivery robot transporting the parcel, and the parcel delivery robot transports the parcel to the delivery lattice on a modular entity platform, and delivers the parcel into the delivery lattice through a parcel unloading device on the parcel delivery robot, where the delivery lattices receives the parcel. Accordingly, the opening portion 1 may be arranged at the delivery lattice, and the opening portion 1 is configured to receive one or more parcels transported by the parcel delivery robot.

Generally speaking, one delivery lattice is capable of receiving parcels from only one destination. Due to resources of the delivery lattice are precious, the case where the robot waits in a line to unload the parcels may occur, which influences the efficiency of the parcel delivery.

Therefore, the embodiment of the present application provides a delivery lattice, which includes a first channel 3. The first channel 3 is directly connected to the opening portion 1 and is capable of receiving the parcels received by the opening portion 1.

In the process of parcel delivery, the parcel delivery robot needs to automatically find the corresponding delivery lattice and delivers the parcel into the corresponding movable container. Therefore, the first channel 3 is provided with a first identification 3010. The first identification 3010 may be a simple digital number, or a two-dimensional code, or a tag having a near field communication function (e.g., a near field communication (NFC) tag, a radio frequency identification (RFID) tag), and the first channel 3 is able to be uniquely identified in the parcel sorting system through the first identification 3010.

Before delivering the parcel, the parcel delivery robot in advance acquires information about a destination to which the parcel transported by the parcel delivery robot is delivered, and the destination information is matched with a specific identification in the channel. For example, the first channel 3 just receives the parcel to be delivered which matches the first identification 3010.

In addition, the delivery lattice includes a second channel 4. The second channel 4 is directly connected to the opening portion 1 and is able to receive the parcel received by the opening portion 1.

In the process of parcel delivery, the parcel delivery robot needs to automatically find the corresponding delivery lattice and delivers the parcel into the corresponding movable container. Therefore, the second channel 4 is provided with a second identification 4010. The second identification 4010 may be a simple digital number, or a two-dimensional code, or a tag having a near field communication function (e.g., a near field communication (NFC) tag, a radio frequency identification (RFID) tag), and the second channel 4 is able to be uniquely identified in the parcel sorting system through the second identification 4010.

Before delivering the parcel, the parcel delivery robot in advance acquires information about a destination to which the parcel transported by the parcel delivery robot is delivered, and the destination information is matched with a specific identification in the channel. For example, the second channel 4 just receives the parcel to be delivered which matches the second identification 4010.

Since two parcel transport channels (i.e., the first channel 3 and the second channel 4) are arranged at one delivery lattice, the efficiency of the parcel delivery is greatly improved.

Since multiple transport channels are provided, when the opening portion 1 receives the parcel, it is necessary to determine whether the parcel belongs to the first channel 3 or the second channel 4. After a specific channel to which the parcel belongs is determined, the opening portion 1 is connected to the first channel 3 or the second channel 4 by using the switching device 2.

In an embodiment, the switching device 2 determines to deliver the current parcel to be delivered to the first channel 3 or the second channel 4 based on the acquired identification (ID) of the current parcel to be delivered. For the delivery lattice provided by the embodiment of the present application, through the arrangement of the opening portion 1, the first channel 3, the second channel 4, and the switching device 2, one delivery lattice may be provided with multiple channels for receiving the parcel, thereby improving the efficiency of the parcel delivery.

The parcel in the first channel 3 is finally received by a first movable container 5, and the parcel in the second channel 4 is finally received by a second movable container 6.

The first movable container 5 and the second movable container 6 may be any device capable of receiving the parcel. For example, the first movable container 5 may be a transit box, a cage car, or a belt conveyor, etc.

The above embodiment discloses a case of two channels. Of course, in addition, more channels may be provided according to actual requirements. According to an embodiment of the present application, the delivery lattice further includes a third channel, and the third channel has a third identification and is configured to receive the parcel matching the third identification.

The third channel is provided with the third identification. The third identification may be a simple digital number, or a two-dimensional code, or a tag having a near field communication function (e.g., a near field communication (NFC) tag, a radio frequency identification (RFID) tag), and the third channel is able to be uniquely identified in the parcel sorting system through the third identification. Before delivering the parcel, the parcel delivery robot in advance acquires information about a destination to which the parcel transported by the parcel delivery robot is delivered, and the destination information is matched with a specific identification in the channel. For example, the third channel just receives the parcel matching the third identification.

Figure 7:
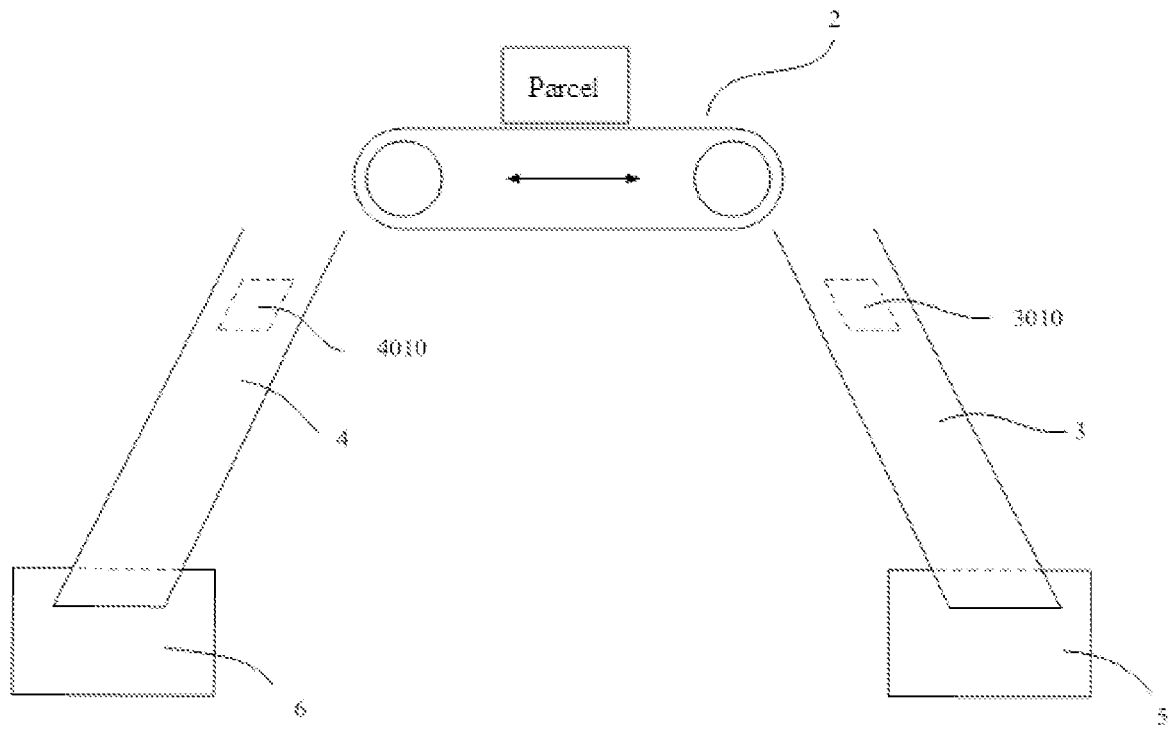
FIG. 7 is a structural diagram of another delivery lattice provided by an embodiment of the present application.

The switching device may be implemented by using various patterns. According to an embodiment of the present application, referring to FIG. 7, the switching device 2 is a conveyor which has two transportation directions (i.e., a left direction and a right direction) in a horizontal direction, and the parcel may be delivered to the first channel 3 or to the second channel 4 according to an actual parcel destination. After that, the parcel, under the action of gravity, falls into the first movable container 5 or the second movable container 6 in the first channel 3 or the second channel 4. That is, the switching device 2 may deliver the parcel to the first channel 3 or the second channel 4 by changing the delivery direction of the parcel.

As an example, the first container 5 and the second container 6 may be ground, in this case, one end of the first/second channel faces towards the conveyor and the other end of the first/second channel is in contact with the ground. The parcel is eventually delivered to different areas of the ground.

According to an embodiment of the present application, the switching device 2 is a belt conveyor having two rotational directions.

According to another embodiment of the present application, the first/second channel and the belt conveyor are on a same plane, the first channel 3 is on a first side of the belt conveyor, and the second channel 4 is on a second side of the belt conveyor. The advantage of such configuration is that the whole channel just occupies one plane in the horizontal direction, and is basically the same high in the vertical direction, thus saving the space of the parcel sorting system.

Figure 8:
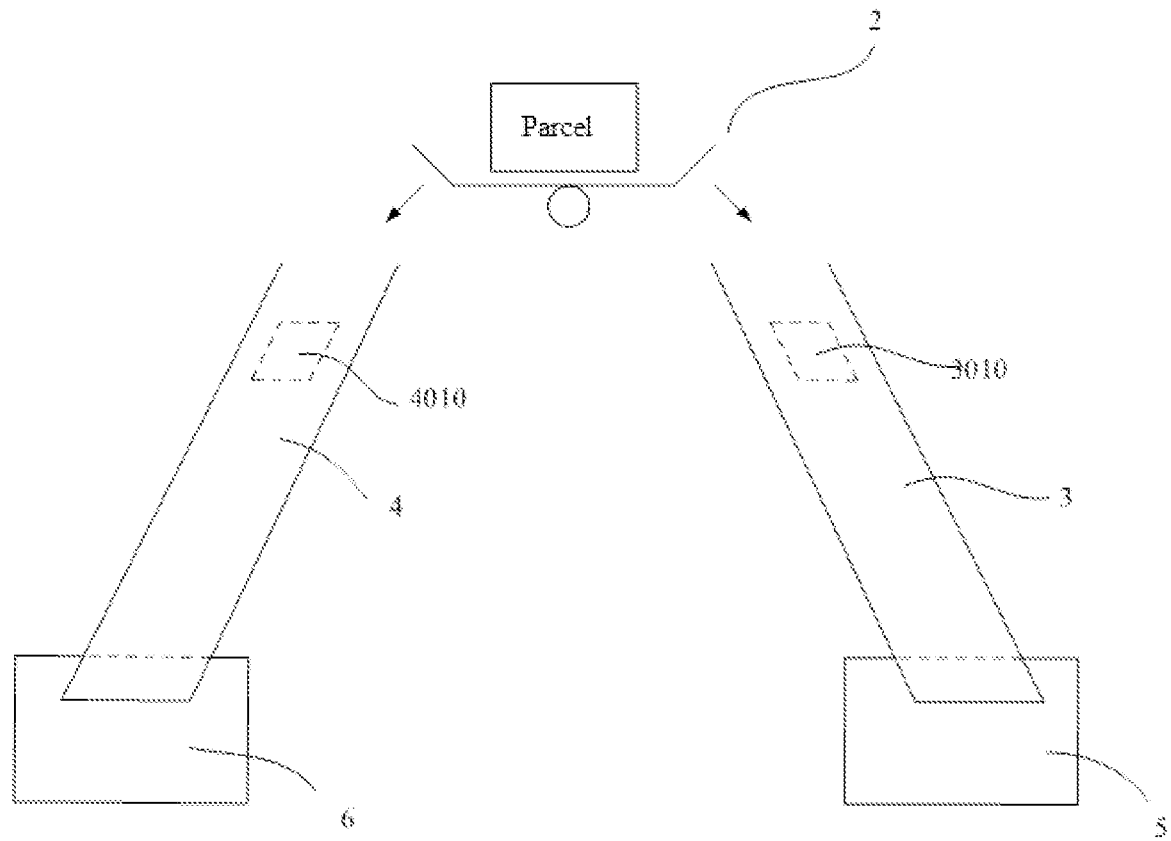
FIG. 8 is a structural diagram of still another delivery lattice provided by an embodiment of the present application.

In addition to switching by using the belt conveyor, according to another embodiment of the present application, referring to FIG. 8, the switching device 2 may also be a tray which has at least two inclined directions.

When the switching device 2 needs to place the parcel into different channels, the inclination direction of the tray may be controlled. Under the action of gravity, the parcel in the tray naturally falls off from the tray, and by respectively positioning the first/second channel at a first preset position and a second preset position which can receive the falling parcel, the parcel can be received. That is, the tray places the parcel into the first/second channel at a third preset position in an inclined manner.

Figure 9:
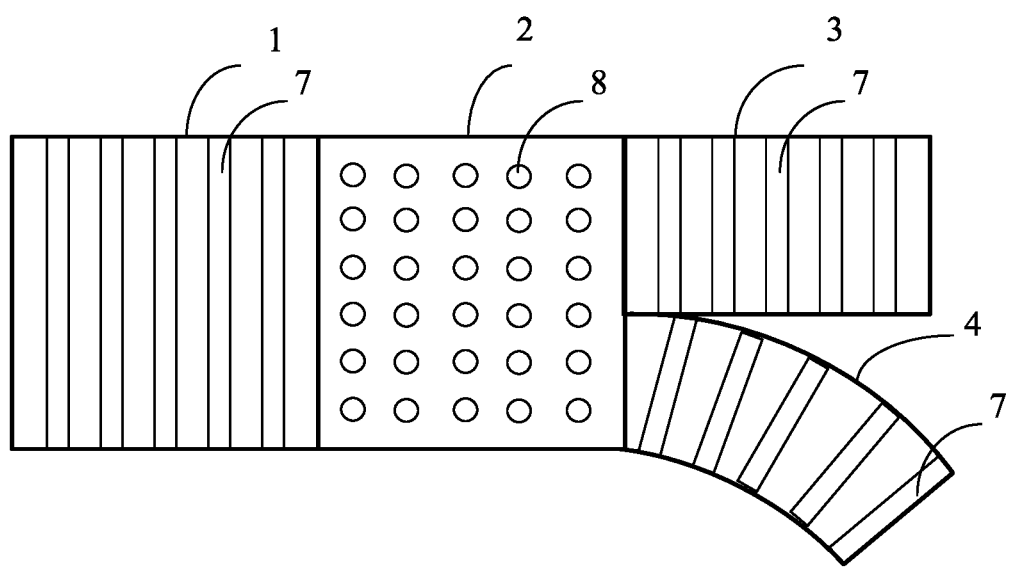
FIG. 9 is a structural diagram of still another delivery lattice provided by an embodiment of the present application.

In addition to the above-mentioned embodiments, according to another embodiment of the present application, referring to FIG. 9, the switching device 2 is a steering wheel 8. In one example, the switching device 2 may include one or more steering wheels 8, and the one or more steering wheels 8 may also form a steering wheel matrix, where the steering wheel 8 has multiple rotation directions.

Correspondingly, the opening portion 1 and the switching device 2 are located on a same plane, and the opening portion 1 may include multiple rotation rollers 7, and the rotation roller 7 has two rolling directions, i.e., a forward rolling direction and a backward rolling direction, in this case, the parcel on a same horizontal plane may be transported into the switching device 2 under the driving of the rotation rollers 7.

In an embodiment, the first channel 3 and the second channel 4 may also be on the same plane as the switching device, and the parcel is delivered to the first channel 3 or the second channel 4 by switching the rotation direction of the steering wheel.

The first channel 3 and the second channel 4 may also include multiple rotation rollers 7 horizontally arranged. The rotation roller 7 has two rolling directions, i.e., a forward rolling direction and a backward rolling direction, in this way, the parcel on a same horizontal plane may be transported from the switching device 2 into the first channel 3 or the second channel 4 under the driving of the rotation rollers 7.

For the delivery lattice provided by the embodiment of the present application, through the arrangement of the opening portion 1, the first channel 3, the second channel 4, and the switching device 2, one delivery lattice may be provided with multiple channels for receiving the parcels, thereby improving the efficiency of the parcel delivery.

The parcel in the embodiment of the present application may be any item capable of being transported. The parcel may be stored on the shelf or manually or mechanically distributed to the parcel delivery robot on an operation board and the like.

The parcel represents any item suitable to be stored, sorted or transported in an automatic inventory, warehouse, manufacturing and/or part processing system, and could be any material, whether animate or inanimate. As an example, the parcel may represent goods stored in the warehouse. The parcel delivery robot may retrieve a specified shelf which contains a particular item associated with a customer order to be packaged so as to facilitate delivery to a customer or elsewhere.

As another example, the parcel may represent baggage stored in a baggage facility at an airport. The moving robot may get back a shelf which contains the baggage to be transported or tracked. The moving robot may further select a particular baggage for explosives screening, move a baggage associated with a flight whose boarding gate has been changed, or remove a baggage belonging to a passenger who has missed a flight.

As another example, the parcel may represent components in a manufacturing toolkit. More specifically, these components may represent components intended to be included in an assembled product, such as computer components for customizing a computer system. In such an embodiment, the moving robot may retrieve particular components identified by specifications related to a customer order.

In an embodiment, the parcel delivery robot should be understood broadly, or be referred to as a moving robot, and the parcel should also be understood broadly, or be referred to as an item to be delivered.

It may be understood that the term "one" should be regarded as "at least one" or "one or more". That is, the number of an element may be one in an embodiment and the number of the element may be multiple in another embodiment. The term "one" should not be considered to limit the number.

Since ordinal numbers such as "first" and "second" are used to describe multiple components, the ordinal numbers are not intended to limit these components herein. Those terms are only used to distinguish one component from another component. For example, a first component may be referred to as a second component, and similarly, the second component may be referred to as the first component, without departing from the concept of the present application. The term "and/or" used herein includes any or all combinations of one or more listed associated items.

Terms used herein are only used to describe embodiments and not intended to limit the present application. As used herein, a singular form is intended to include a plural form, unless clearly indicated in the context. In addition, it will be understood that the terms "including" and/or "having" used in the specification are intended to mean the existence of the described features, numbers, steps, operations, components, elements or combinations thereof, without excluding the existence or addition of one or more other features, numbers, steps, operations, components, elements, or combinations thereof.

The terms used herein, including technical and scientific terms, have the same meanings as the terms commonly understood by those skilled in the art, as long as the terms are not defined differently. It should be understood that the terms defined in the commonly used dictionaries have consistent meanings with the terms in the related art.

What is claimed is:

1. A parcel sorting system, arranged in layers and comprising: a parcel sorting layer located on an upper layer of the parcel sorting system, a moveable container carrying layer located on a lower layer of the parcel sorting system, a parcel delivery robot and a control device; wherein the parcel sorting layer comprises a modular entity platform capable of carrying the parcel delivery robot, wherein the modular entity platform is a physical platform formed by splicing a plurality of splicable units and configured for sorting parcels; the modular entity platform comprises a plurality of delivery lattices arranged in an array and a traveling area constituted by gaps between the plurality of delivery lattices and configured for the parcel delivery robot traveling, one of the plurality of delivery lattices corresponds to one or more delivery path directions;

the moveable container carrying layer comprises a plurality of moveable containers, and a first number of the movable containers are located below the plurality of delivery lattices and configured to receive the parcels from the parcel sorting layer, wherein the first number is less than a total number of the movable containers on the movable container carrying layer;

the control device is configured to, according to information about a parcel, information about the delivery lattices and path condition information about a current traveling area, determine a target delivery lattice and a delivery path and send the target delivery lattice and the delivery path to the parcel delivery robot; and the parcel delivery robot is configured to run in the traveling area on the modular entity platform according to the delivery path sent by the control device, and deliver the parcel into a movable container arranged below the target delivery lattice through the target delivery lattice according to the delivery path;

wherein the plurality of delivery lattices each comprise:

an opening portion which is configured to receive one or more parcels delivered by the parcel delivery robot;

a first channel which has a first identification and is configured to receive a parcel matching the first identification;

a second channel which has a second identification and is configured to receive a parcel matching the second identification; and a switching device which is configured to receive the parcel transmitted by the opening portion and determine to deliver a current parcel to one of the first channel or the second channel based on an acquired identification (ID) of the current parcel.

2. The system of claim 1, wherein the plurality of splicable units each have at least one shape of: a strip, an arc, a zigzag or a triangle, each layer of the modular entity platform is formed by splicing the plurality of splicable units, and the modular entity platform has a shape of a cube or an annular cylinder.

3. The system of claim 1, wherein the modular entity platform is arranged in single-layer or arranged in multi-layer; in a modular entity platform arranged in multi-layer, every two adjacent layers are arranged in parallel, and a second number of the movable containers are located directly below the plurality of delivery lattices, wherein the second number is less than or equal to the first number.

4. The system of claim 3, wherein in the modular entity platform arranged in multi-layer, positions of the delivery lattices at different layers are same in a horizontal direction, or projections of the delivery lattices at different layers in a vertical direction are completely overlapped.

5. The system of claim 1, wherein the parcel delivery robot is configured to, when delivering the parcel into the movable container arranged below the target delivery lattice through the target delivery lattice according to the delivery path, maintain a movement state of running at a constant speed or implementing a deceleration during a process in which the parcel delivery robot runs to the target delivery lattice and delivers the parcel into the movable container arranged below the target delivery lattice through the target delivery lattice.

6. The system of claim 1, further comprising: a carrying robot configured to carry the movable container.

7. The system of claim 6, wherein the movable container comprises a cage car; the carrying robot is located below the cage car and is configured to drive the cage car to travel on the movable container carrying layer.

8. The system of claim 6, wherein the control device is further configured to, when the parcel collected in the movable container satisfies a collection condition, take the movable container as a target movable container, lock a delivery lattice bound to a position where the target movable container is located, allocate a first carrying robot to the target movable container, plan a carrying path for the first carrying robot according to the position where the target movable container is located, generate a carrying instruction corresponding to the target movable container, and send the carrying instruction to the first carrying robot, wherein the carrying instruction comprises the carrying path for the first carrying robot; and the first carrying robot is configured to, in response to the carrying instruction, travel to the target movable container and carry the target movable container to a parcel collection station according to the carrying path for the first carrying robot.

9. The system of claim 8, wherein the collection condition comprises at least one of the following: the movable container being full or a movable container collection time being reached;

the control device is configured to determine whether the parcel collected in the movable container satisfies the collection condition in at least one of the following manners:

in response to the control device receiving a message that the movable container is full from a sensor, determining that the parcel collected in the movable container satisfies the collection condition; or in response to the control device detecting that a total volume of the delivered parcel in the movable container reaches a preset volume threshold or the movable container collection time is reached, determining that the parcel collected in the movable container satisfies the collection condition.

10. The system of claim 8, wherein the control device is further configured to, after the first carrying robot carries the target movable container to the parcel collection station, allocate a second carrying robot to an idle movable container, plan a carrying path for the second carrying robot according to a position where the target movable container is located before being carried, generate a carrying instruction corresponding to the idle movable container, and send the carrying instruction to the second carrying robot, wherein the carrying instruction comprises the carrying path for the second carrying robot; and the second carrying robot is configured to, in response to the carrying instruction corresponding to the idle movable container, carry the idle movable container to the position where the target movable container is located before being carried according to the carrying path for the second carrying robot, and the delivery lattice bound to the position where the target movable container is located before being carried is unlocked.

11. The system of claim 1, wherein the traveling area of the modular entity platform is provided with an identification icon, and the identification icon is configured to, during a process of the parcel delivery robot traveling, assist the parcel delivery robot to determine whether a current traveling path is consistent with the delivery path sent by the control device.

12. The system of claim 1, further comprising: a supply station and a code scanning device; wherein the code scanning device is arranged in a code scanning area on the modular entity platform;

the supply station is configured to allocate a parcel to be delivered to the parcel delivery robot;

the parcel delivery robot is further configured to carry the parcel to be delivered into the code scanning area after acquiring the parcel to be delivered from the supply station; and the code scanning device is configured to acquire information about the parcel to be delivered and send the information about the parcel to be delivered to the control device.

13. The system of claim 1, wherein the control device is further configured to: after the parcel delivery robot delivers the parcel to the movable container arranged below the target delivery lattice through the target delivery lattice according to at least one of a shortest path principle or a shortest waiting principle, determine a next task location and a next traveling path of the parcel delivery robot, and send the next task location and the next traveling path of the parcel delivery robot to the parcel delivery robot; and the parcel delivery robot is further configured to run to the next task location to execute a next task in the traveling area on the modular entity platform according to the received next traveling path.

14. The system of claim 1, further comprising: a third channel which has a third identification and is configured to receive a parcel matching the third identification.

15. The system of claim 1, wherein the switching device is a conveyor, and the conveyor is configured to deliver the parcel to one of the first channel or the second channel by changing a delivery direction of the parcel;

wherein one end of the first channel and one end of the second channel are both close to the conveyor, and another end of the first channel and another end of the second channel are both in contact with ground.

16. The system of claim 1, wherein the switching device is a conveyor belt, and the conveyor belt has two rotational directions;

wherein the first channel and the second channel are both on a same plane as the conveyor belt, the first channel is on a first side of the conveyor belt and the second channel is on a second side of the conveyor belt.

17. The system of claim 1, wherein the switching device is a tray, and the tray comprises at least two inclined directions;

wherein the first channel is located at a first preset position, the second channel is located at a second preset position, and the tray is configured to place the parcel into the first channel or the second channel in an inclined manner at a third preset position.

18. The system of claim 1, wherein the switching device is a steering wheel, and the steering wheel comprises a plurality of rotation directions;

wherein the steering wheel is located in a same plane as the first channel and the second channel, and the parcel is delivered to one of the first channel or the second channel by switching the rotation direction through the steering wheel.

19. A parcel sorting method, comprising:

determining, by a control device, a target delivery lattice and a delivery path according to information about a parcel, information about delivery lattices and path condition information about a current traveling area, and sending the target delivery lattice and the delivery path to a parcel delivery robot; and the parcel delivery robot running in the traveling area on a modular entity platform according to the delivery path sent by the control device, and delivering the parcel to a movable container arranged below the target delivery lattice through the target delivery lattice according to the delivery path, wherein the modular entity platform is capable of carrying the parcel delivery robot and is located on a parcel sorting layer; the modular entity platform is a physical platform formed by splicing a plurality of splicable units and configured for sorting parcels; the modular entity platform comprises a plurality of delivery lattices arranged in an array and the traveling area constituted by gaps between the plurality of delivery lattices and configured for the parcel delivery robot traveling, one of the plurality of delivery lattices corresponds to one or more delivery path directions; a plurality of movable containers are located on a moveable container carrying layer, and a first number of the movable containers are located below the plurality of delivery lattices and configured to receive the parcels from the parcel sorting layer, the first number is less than a total number of the movable containers on the movable container carrying layer;

wherein the plurality of delivery lattices each comprise:

an opening portion which is configured to receive one or more parcels delivered by the parcel delivery robot;

a first channel which has a first identification and is configured to receive a parcel matching the first identification;

a second channel which has a second identification and is configured to receive a parcel matching the second identification; and a switching device which is configured to receive the parcel transmitted by the opening portion and determine to deliver a current parcel to one of the first channel or the second channel based on an acquired identification (ID) of the current parcel.

\* \* \* \* \*